United States Patent
Yoshikawa et al.

[11] Patent Number: 6,137,617
[45] Date of Patent: Oct. 24, 2000

[54] OPTICAL SCANNER, AND IMAGE READING APPARATUS AND IMAGE FORMING APPARATUS USING THE SAME

[75] Inventors: Motonobu Yoshikawa; Yoshiharu Yamamoto, both of Osaka, Japan

[73] Assignee: Matsushita Electric Industrial Co., Ltd., Osaka, Japan

[21] Appl. No.: 09/461,121

[22] Filed: Dec. 14, 1999

[30] Foreign Application Priority Data

Dec. 18, 1998 [JP] Japan ..... 10-360544

[51] Int. Cl.$^7$ ..... G02B 26/08
[52] U.S. Cl. ..... 359/207; 359/205; 359/206; 359/216; 359/217
[58] Field of Search ..... 359/205–207, 359/216–219, 662, 710, 711, 718; 347/259

[56] References Cited

U.S. PATENT DOCUMENTS

| | | |
|---|---|---|
| 5,111,219 | 5/1992 | Mikino . |
| 5,329,399 | 7/1994 | Ho ..... 359/662 |
| 5,600,475 | 2/1997 | Mochizuki et al. ..... 359/206 |
| 5,875,051 | 2/1999 | Suzuki et al. ..... 359/205 |

FOREIGN PATENT DOCUMENTS

| | | |
|---|---|---|
| 62-139520 | 6/1987 | Japan . |
| 8-248308 | 9/1996 | Japan . |
| 9-281422 | 10/1997 | Japan . |
| 10-148755 | 6/1998 | Japan . |

*Primary Examiner*—James Phan
*Attorney, Agent, or Firm*—Merchant & Gould P.C.

[57] ABSTRACT

A high-performance optical scanner in which the f$\theta$ characteristics and the field curvature are compensated excellently by shifting an optical deflector by an optimum amount and using a collecting lens that can be processed easily. The optical scanner includes, in one embodiment: a semiconductor laser 1; a polygon mirror 4 as an optical deflector; a cylindrical lens 3 as a first imaging optical system; and a correcting lens 6 as a second imaging optical system formed of one correcting lens having a curved-axis toric surface. A formula of $0.15 < \{\Delta X \cdot \cos(\alpha/2)\}/rp < 0.35$ is satisfied, wherein $\Delta X$ indicates a shift amount that is the distance between a reflecting point at a scanning center and the center of a deflecting plane, $\alpha$ represents an angle of reflection on the deflecting plane at the scanning center, and rp denotes the radius of an inscribed circle in the polygon mirror 4. Thus, the asymmetry in field curvature in the main scanning direction caused by the oblique incidence of light onto the deflecting plane and in f$\theta$ characteristics can be compensated merely by the shift of the optical deflector.

8 Claims, 15 Drawing Sheets

OPTICAL SCANNER, AND IMAGE READING APPARATUS AND IMAGE FORMING APPARATUS USING THE SAME

FIELD OF THE INVENTION

The present invention relates to an optical scanner, which can be used in laser beam printers, laser facsimiles, digital document copiers, or the like.

BACKGROUND OF THE INVENTION

Conventionally, an optical scanner used in a laser beam printer or the like includes, in many cases: a semiconductor laser as a light source; a polygon mirror as an optical deflector; a first imaging optical system for focusing a light beam from the semiconductor laser linearly on the polygon mirror to compensate for the tilt of the surface of the polygon mirror; and a second imaging optical system for forming a uniform spot on a surface to be scanned at constant velocity.

Recently, in order to attain reductions in cost and size, a second imaging optical system formed of one correcting lens has been proposed in JP-A-4-50908, JP-A-62-139520, JP-A-9-281422, JP-A-9-179017, JP-A-8-248308, JP-A-10-148755, or the like.

However, the systems proposed in JP-A-4-50908 and JP-A-62-139520 are not formed considering the asymmetric aberration that is caused by the shift of the reflecting point due to the rotation of the deflecting plane. The system proposed in JP-A-9-179017 does not compensate for the asymmetric aberration caused by the oblique incidence of light onto a deflecting plane. The system proposed in JP-A-9-281422 compensates for the asymmetric aberration caused by the oblique incidence of light onto a deflecting plane by a lens shape alone, resulting in a complicated shape and difficulty in processing.

The system proposed in JP-A-8-248308 compensates for asymmetric constituents of the field curvature in the main scanning direction by the positioning of an optical deflector and the shift of a correcting lens. However, the compensation is insufficient, and in order to compensate for the field curvature in the sub scanning direction, both planes have complicated curved surfaces that are processed with difficulty.

Further, the system proposed in JP-A-10-148755 also can provide an effect compensating for the asymmetric constituents of the field curvature in the main scanning direction by the positioning of an optical deflector, but the compensation is not enough. In addition, since its cross section in the sub scanning direction has a biconvex shape, the numerical aperture in the sub scanning direction on the image surface side varies greatly and thus the beam diameter in the sub scanning direction also varies greatly, which has been a problem.

SUMMARY OF THE INVENTION

The present invention resolves the conventional problems as described above and aims to provide a high-performance optical scanner in which the fθ characteristics and the field curvature are compensated excellently by using one correcting lens that can be processed with relative ease.

In order to attain the above-mentioned object, a first optical scanner of the present invention includes: a light source; an optical deflector for scanning a light beam from the light source; a first imaging optical system that is positioned between the light source and the optical deflector and that forms a line image on a deflecting plane of the optical deflector; and a second imaging optical system formed of one correcting lens positioned between the optical deflector and a surface to be scanned. The first imaging optical system is positioned in a plane parallel to a main scanning direction including the normal line of the deflecting plane of the optical deflector. The first imaging optical system is formed so that a light beam from the first imaging optical system is incident obliquely onto the deflecting plane with respect to the main scanning direction. At least one plane of the correcting lens is a curved-axis toric surface in which the line extending between the centers of curvature of the cross section in a sub scanning direction is a curved line. The optical deflector is positioned so that the reflecting point at the scanning center is shifted in the direction moving away from the center of the deflecting plane and from the light source. In the present optical scanner, the following Formula 3 is satisfied:

[Formula 3]

$$0.15 < \frac{\Delta X \cdot \cos(\alpha/2)}{rp} < 0.35$$

wherein $\Delta X$ indicates a shift amount that is the distance between the reflecting point at the scanning center and the center of the deflecting plane, $\alpha$ represents an angle of reflection on the deflecting plane at the scanning center, and rp denotes the radius of an inscribed circle in the optical deflector.

According to such an optical scanner as described above, the asymmetry in field curvature in the main scanning direction caused by the oblique incidence of light onto the deflecting plane and in fθ characteristics can be compensated merely by shifting the position of the optical deflector.

In the first optical scanner, it is preferable that in the correcting lens, the plane on the side from which light goes out (hereinafter referred to as an "outgoing side") is a curved-axis toric surface, the cross sectional shape in the main scanning direction including an optical axis is symmetrical with respect to the optical axis, and the curved line extending between the centers of curvature of the cross section in the sub scanning direction is asymmetric with respect to the optical axis. According to such an optical scanner as described above, the correcting lens can be processed easily.

Further, it is preferable that a plane of incidence of the correcting lens is an aspheric cylindrical plane that has a cross sectional shape in the main scanning direction with high order expansion terms of at least fourth order and that has a refractive power only in the main scanning direction. According to such an optical scanner as described above, the correcting lens can be processed easily.

A second optical scanner of the present invention includes: a light source; an optical deflector that scans a light beam from the light source and that has at least six deflecting planes; a first imaging optical system that is positioned between the light source and the optical deflector and that forms a line image on a deflecting plane of the optical deflector; and a second imaging optical system formed of one correcting lens positioned between the optical deflector and a surface to be scanned. The first imaging optical system is positioned in a plane parallel to the main scanning direction including the normal line of the deflecting plane of the optical deflector. The first imaging optical system is formed so that a light beam from the first imaging optical system is incident obliquely onto the deflecting plane with respect to the main scanning direction. The plane on the outgoing side of the correcting lens is a curved-axis toric surface in which the line extending between the centers of curvature of the cross section in the sub scanning direction is a curved line. A plane of incidence of the correcting lens is an aspheric cylindrical plane that has a cross sectional shape in the main scanning direction with high order expansion terms of at least fourth order and that has a refractive power only in the main scanning direction. The optical deflector is positioned so that the reflecting point at the scanning center is shifted in the direction moving away from the center of the deflecting plane and from the light source within the range in which the light beam is not omitted in the vicinity of the edge of the deflecting plane.

According to such an optical scanner as described above, an aspheric cylindrical plane is employed as the plane of incidence of the correcting lens. Therefore, the correcting lens can be processed easily and the variation in beam diameter in the sub scanning direction can be suppressed to a low level.

In the second optical scanner, it is preferred to satisfy the following Formula 4:
[Formula 4]

$$0.15 < \frac{\Delta X \cdot \cos(\alpha/2)}{rp} < 0.35$$

wherein $\Delta X$ indicates a shift amount that is the distance between the reflecting point at the scanning center and the center of the deflecting plane, $\alpha$ represents an angle of reflection on the deflecting plane at the scanning center, and rp denotes the radius of an inscribed circle in the optical deflector.

According to such an optical scanner as described above, the asymmetry in field curvature in the main scanning direction caused by the oblique incidence of light onto the deflecting plane and in fθ characteristics can be compensated merely by shifting the position of the optical deflector.

Furthermore, it is preferable that on the outgoing side, the correcting lens has a curved-axis toric surface in which the cross sectional shape in the main scanning direction including an optical axis is asymmetric with respect to the optical axis and the curved line extending between the centers of curvature of the cross section in the sub scanning direction is asymmetric with respect to the optical axis. According to such an optical scanner as described above, a high resolution can be obtained.

An image reading apparatus of the present invention is characterized by using any one of the optical scanners described above. According to such an image reading apparatus as described above, one of the optical scanners described above is used, thus achieving the reduction in size and cost and a high resolution.

An image forming apparatus of the present invention is characterized by using any one of the optical scanners described above. According to such an image forming apparatus as described above, one of the optical scanners described above is used, thus achieving the reduction in size and cost and a high resolution.

DETAILED DESCRIPTION OF THE INVENTION

An optical scanner according to an example of the present invention is described with reference to the drawings as follows.

First Embodiment

Figure 1:
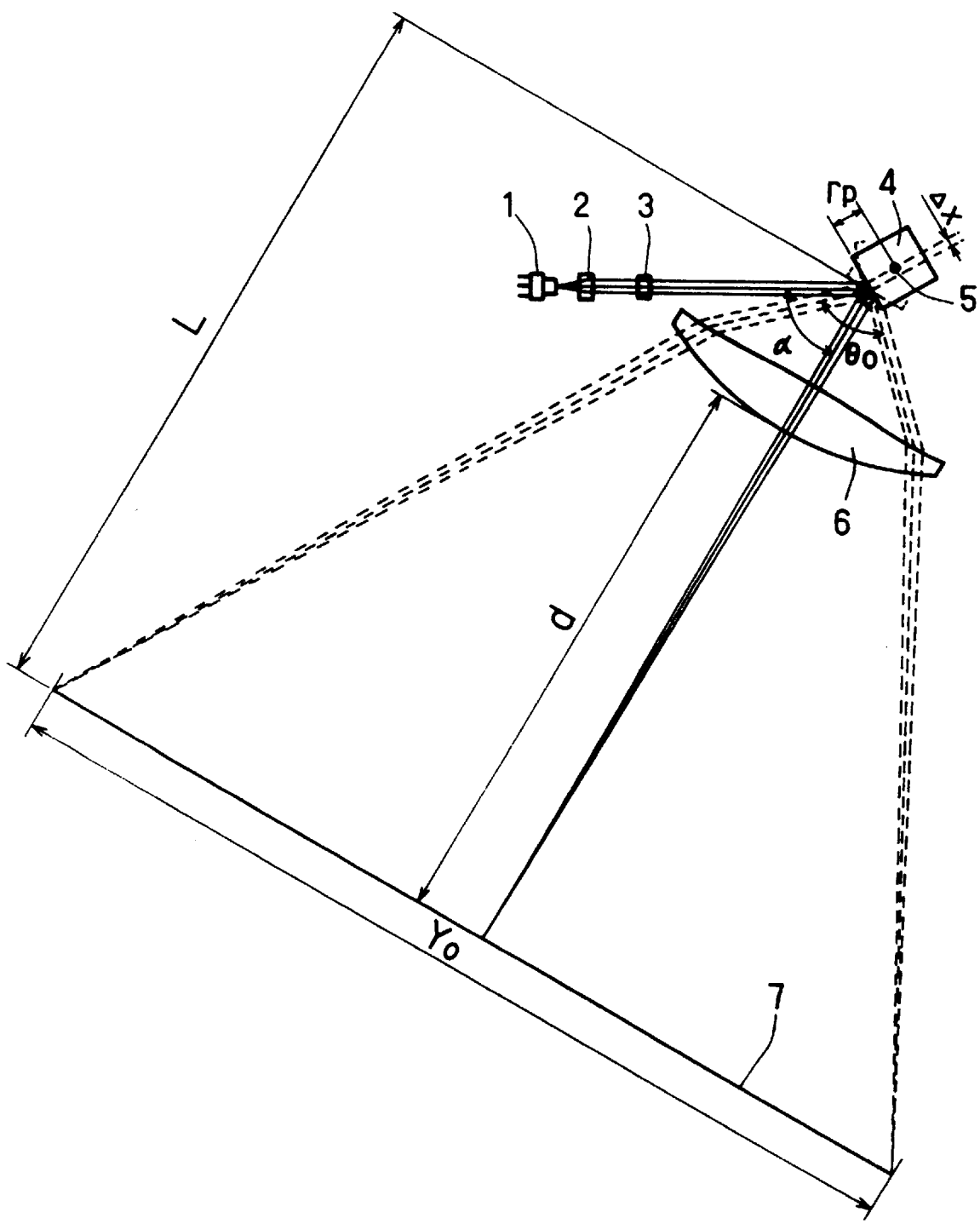
FIG. 1 is a structural view showing an optical scanner according to a first embodiment of the present invention.
Figure 2B:
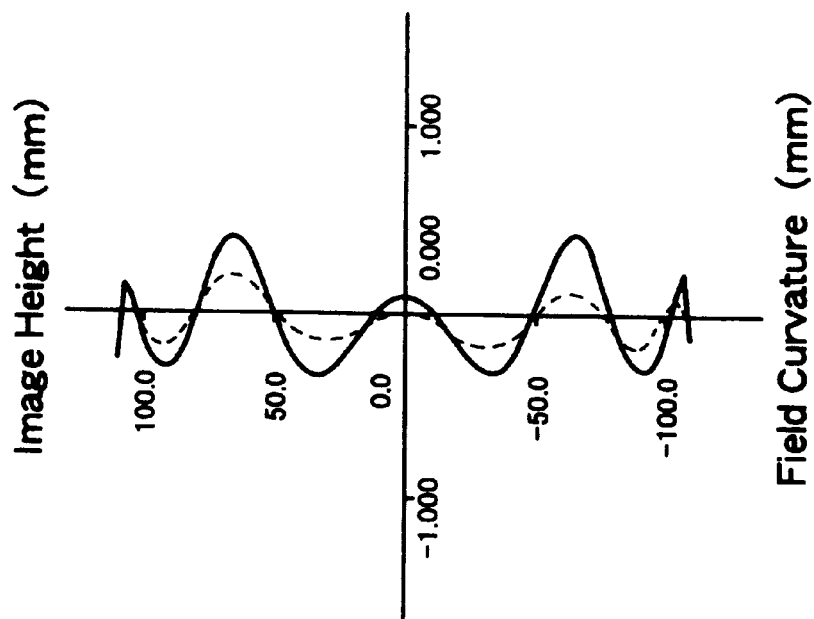
FIG. 2B shows amounts of field curvature in the optical scanner according to the first example of the present invention.
Figure 2A:
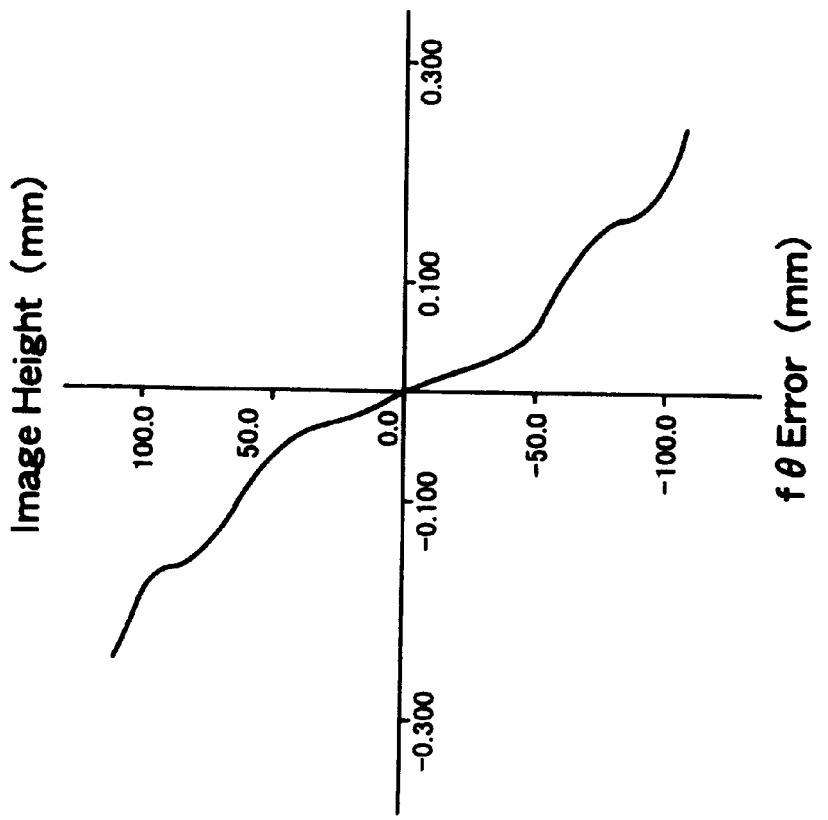
FIG. 2A shows the fθ errors in the optical scanner according to a first example of the present invention.
Figure 3B:
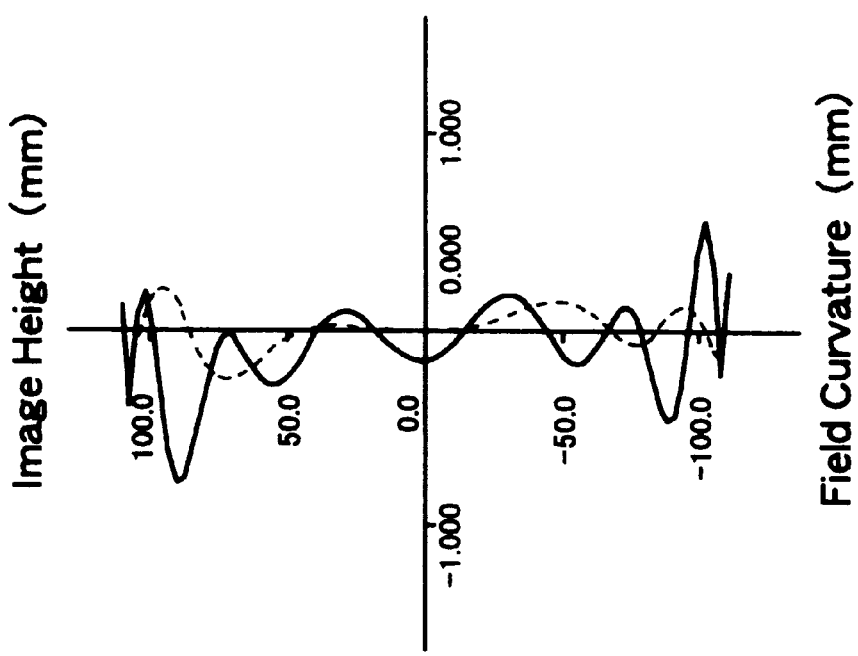
FIG. 3B shows amounts of field curvature in the optical scanner according to the second example of the present invention.
Figure 3A:
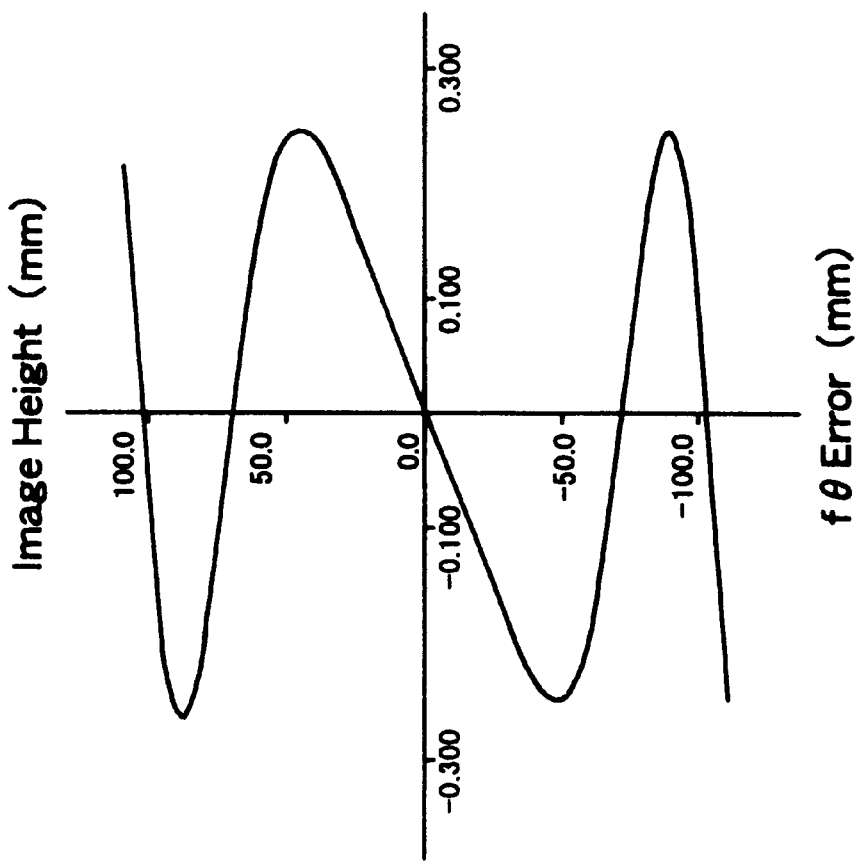
FIG. 3A shows the fθ errors in an optical scanner according to a second example of the present invention.
Figure 4B:
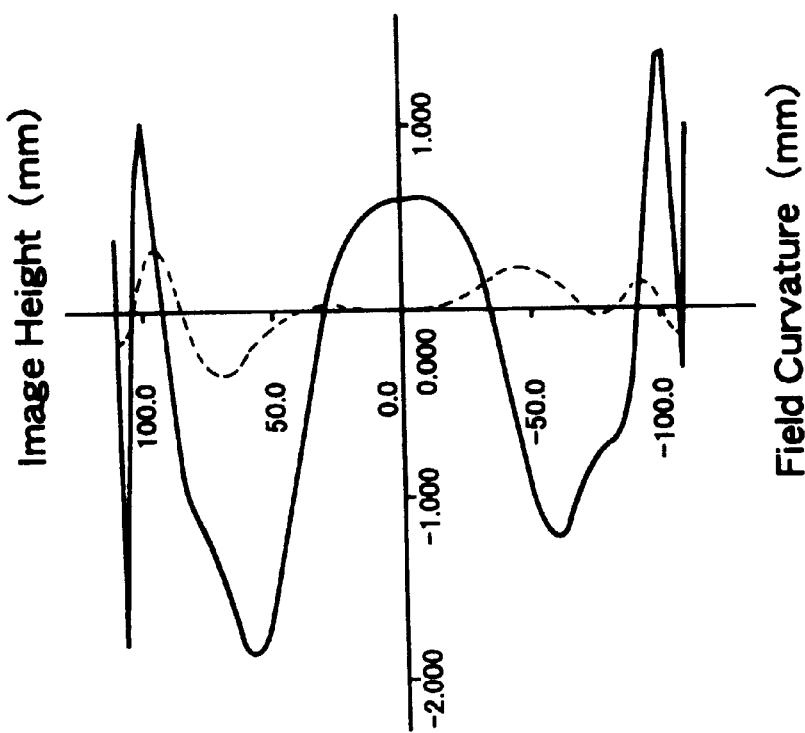
FIG. 4B shows amounts of field curvature in the optical scanner according to the third example of the present invention.
Figure 4A:
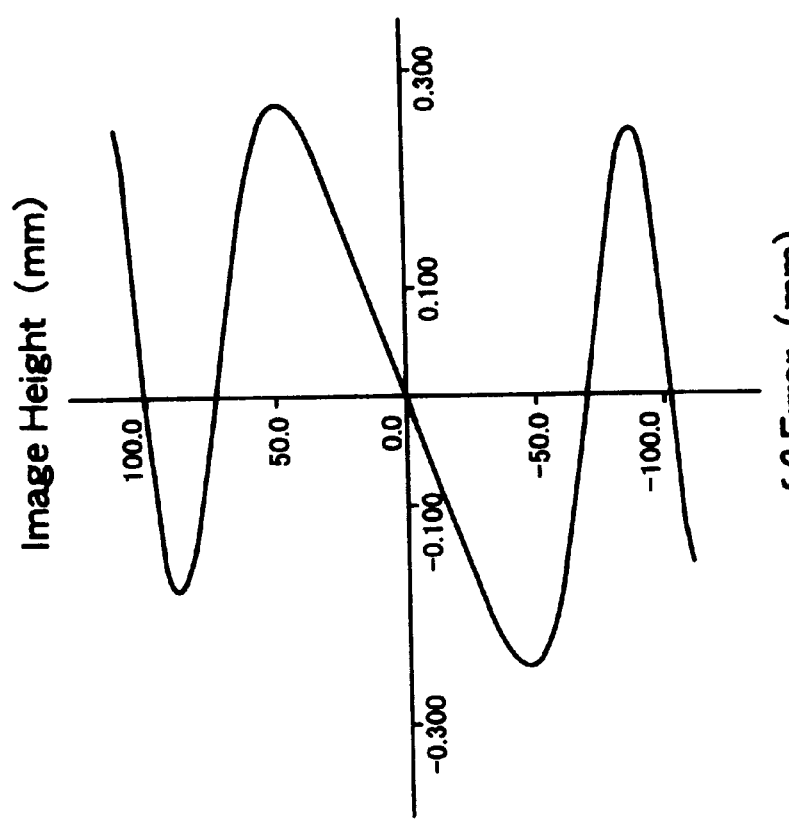
FIG. 4A shows the fθ errors in an optical scanner according to a third example of the present invention.
Figure 5B:
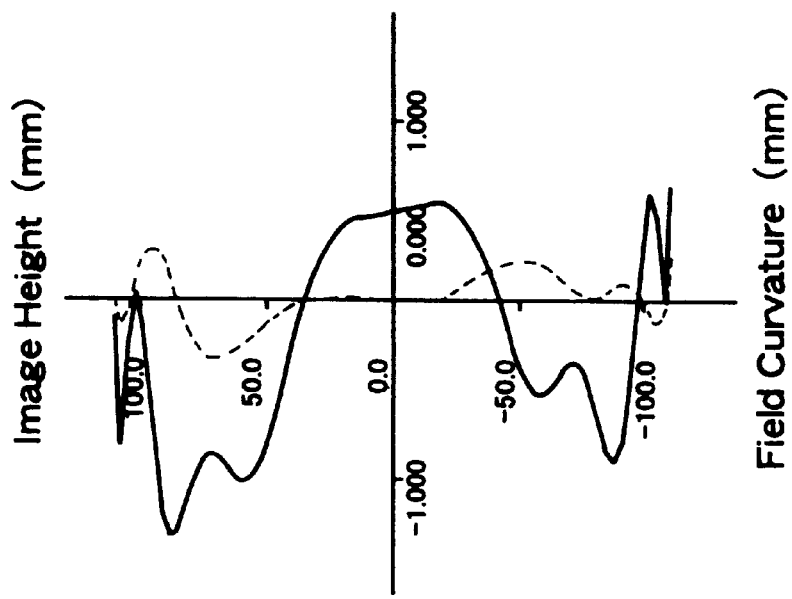
FIG. 5B shows amounts of field curvature in the optical scanner according to the fourth example of the present invention.
Figure 5A:
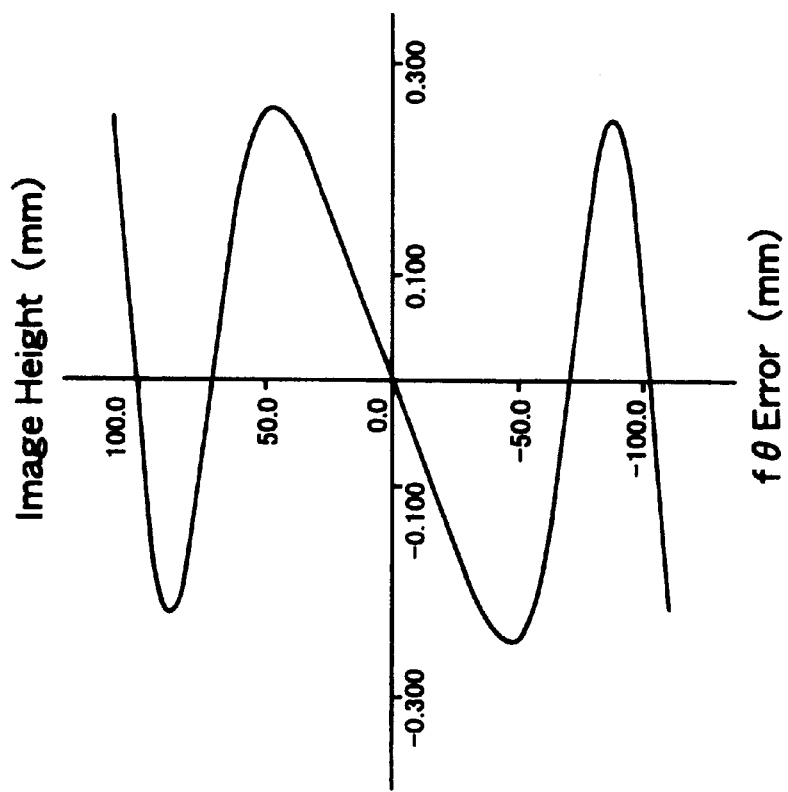
FIG. 5A shows the fθ errors in an optical scanner according to a fourth example of the present invention.
Figure 6B:
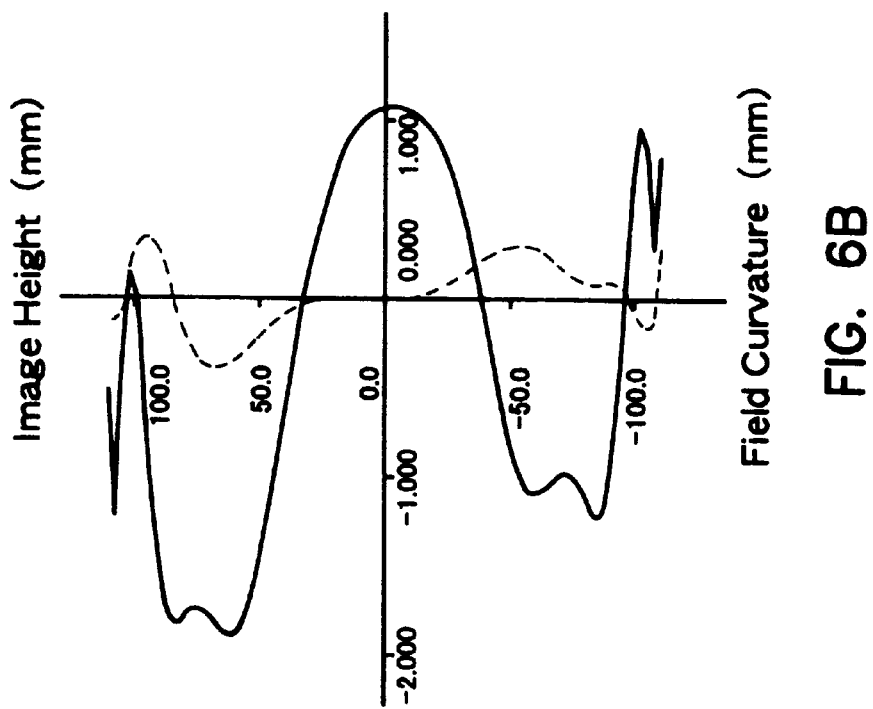
FIG. 6B shows amounts of field curvature in the optical scanner according to the fifth example of the present invention.
Figure 6A:
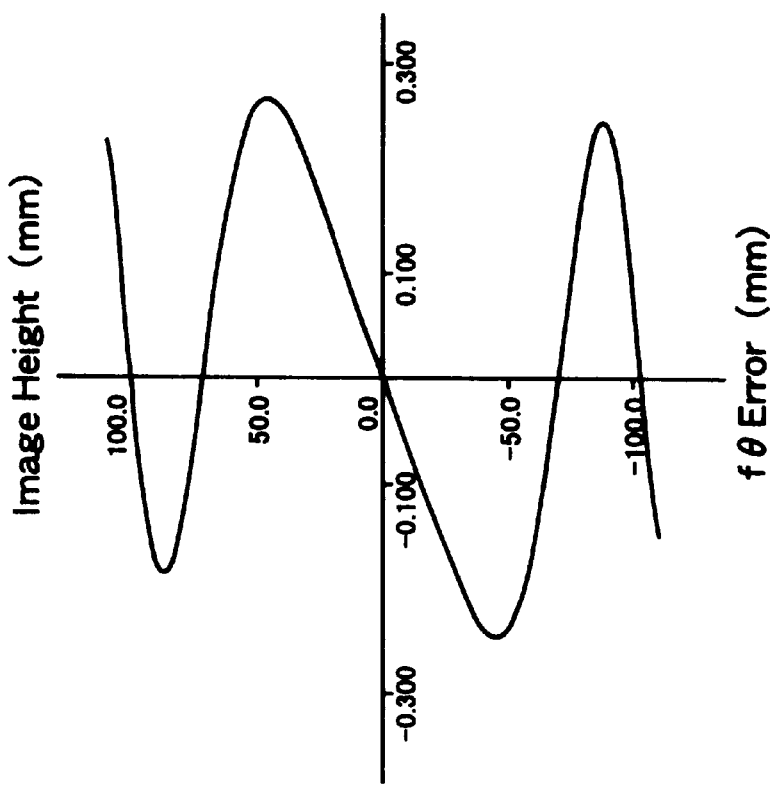
FIG. 6A shows the fθ errors in an optical scanner according to a fifth example of the present invention.

FIG. 1 shows a structural view of an optical scanner according to a first embodiment. The optical scanner shown in FIG. 1 includes: a semiconductor laser 1 as a light source; an axisymmetric lens 2; a polygon mirror 4 as an optical deflector for scanning a light beam from the semiconductor laser 1; a cylindrical lens 3 as a first imaging optical system that is positioned between the semiconductor laser 1 and the polygon mirror 4 and that has a refractive power in the sub scanning direction; and a correcting lens 6 as a second imaging optical system formed of one correcting lens. Numerals 5 and 7 denote a rotation central axis and a surface to be scanned.

The cylindrical lens 3 forms a line image on a deflecting plane of the polygon mirror 4. The cylindrical lens 3 is positioned in a plane parallel to the main scanning direction including the normal line of the deflecting plane of the polygon mirror 4. A light beam from this cylindrical lens 3 is incident obliquely onto the deflecting plane with respect to the main scanning direction. At least one plane of the correcting lens 6 is a curved-axis toric surface in which the line extending between the centers of curvature of the cross section in the sub scanning direction is a curved line.

The polygon mirror 4 is positioned so that the reflecting point at the scanning center is shifted in the direction moving away from the center of the deflecting plane and from the semiconductor laser 1. The polygon mirror 4 satisfies the following Formula 5:
[Formula 5]

$$0.15 < \frac{\Delta X \cdot \cos(\alpha/2)}{rp} < 0.35$$

wherein $\Delta X$ (mm) indicates a shift amount that is the distance between the reflecting point at the scanning center and the center of the deflecting plane, $\alpha$ (deg) represents an angle of reflection on the deflecting plane at the scanning center, and rp (mm) denotes the radius of an inscribed circle in the polygon mirror 4.

The operation of the optical scanner with the above-mentioned configuration is described as follows. A light beam from the semiconductor laser 1 is converted into a parallel light beam, a convergent light beam, or a divergent light beam by the axisymmetric lens 2, which enters into the cylindrical lens 3 and is focused in the vicinity of the reflecting surface of the polygon mirror 4 with respect to the sub scanning direction. The polygon mirror 4 rotates about the rotation central axis 5 and deflects the incident laser beam. By passing through the correcting lens 6, the deflected beam is focused on the surface 7 to be scanned, thus scanning the surface 7 to be scanned.

The correcting lens 6 is positioned so that the deflection point and the surface 7 to be scanned have a geometrical-optical conjugate relationship in the sub scanning direction. The correcting lens 6 compensates for the tilt of the surface of the polygon mirror 4. In addition, the correcting lens 6 also compensates for the field curvature and the fθ characteristics. By shifting the polygon mirror 4 by an amount of $\Delta X$, the asymmetry in field curvature 10 in the main scanning direction caused by the oblique incidence of light onto the deflecting/reflecting surface and in fθ characteristics are compensated. In other words, the asymmetry in field curvature in the main scanning direction caused by the oblique incidence of light onto the deflecting surface and in fθ characteristics can be compensated merely by the effect obtained by shifting the position of the optical deflector.

As described above, according to the present embodiment, by shifting the polygon mirror by an optimum amount, the field curvature and the fθ characteristics can be compensated excellently using one correcting lens with a shape that can be processed with relative ease. Thus, an optical scanner with a high resolution can be obtained at a low cost.

In the above-mentioned Formula 5, it is preferable that the value of $\{\Delta X \cdot \cos(\alpha/2)\}/rp$ is in the range larger than 0.20 but smaller than 0.30, more preferably in the range larger than 0.24 but smaller than 0.26.

Examples are described as follows. In each example, the plane of incidence of the correcting lens 6 is an aspheric cylindrical plane having a refractive power only in the main scanning direction. With the premise that the vertex of the plane is the origin and the direction in which an incident beam of light travels forward is positive, the sag Z (mm) from the vertex at a point with the coordinate y (mm) in the main scanning direction is expressed by the following Formula 6:
[Formula 6]

$$Z = \frac{\left(\frac{1}{RDy1}\right)y^2}{1+\sqrt{1-(1+K1)\left(\frac{1}{RDy1}\right)^2 y^2}} + AD1y^4 + AE1y^6 + AF1y^8 + AG1y^{10}$$

wherein RDy1 (mm) represents the radius of curvature in the main scanning direction, K1 indicates a conic constant contributing in the main scanning direction, and AD1, AE1, AF1, and AG1 denote high-order constants contributing in the main scanning direction.

The plane on the outgoing side of the correcting lens 6 is a curved-axis toric surface in which the line extending between the centers of curvature of the cross section in the sub scanning direction is a curved line. With the premise that the vertex of the plane is the origin and the direction in which an incident beam of light travels forward is positive, the sag Z (mm) from the vertex at a point with the coordinate x (mm) in the sub scanning direction and the coordinate y (mm) in the main scanning direction is expressed by the following Formula 7:
[Formula 7]

$$Z = P(y) + \frac{x^2}{RDx2}{1+\sqrt{1-\left(\frac{x}{RDx2}\right)^2}}$$

P(y) is expressed by the following Formula 8:
[Formula 8]

$$P(y) = \frac{\left(\frac{y^2}{RDy2}\right)}{1+\sqrt{1-(1+K2)\left(\frac{y}{RDy2}\right)^2}} + AD2y^4 + AE2y^6 + AF2y^8 + AG2y^{10}$$

RDx2 is expressed by the following Formula 9:
[Formula 9]

$$RDx2 = RDs\,(1+BC_y^2+BD_y^4+BE_y^6+BF_y^8+BG_y^{10}+BOCy+BOD_y^3+BOE_y^5+BOF_y^7+BOG_y^9)$$

In the above formula 8, P(y) expresses a non-arc that is a cross sectional shape in the main scanning direction including an optical axis, RDy2 (mm) indicates the radius of curvature in the main scanning direction, K2 represents a conic constant contributing in the main scanning direction, and AD2, AE2, AF2, and AG2 denote high-order constants contributing in the main scanning direction.

RDx2 represents a function indicating the radius of curvature in the sub scanning direction at each point on the y coordinate, RDs (mm) indicates the radius of curvature in the sub scanning direction at the center, BC, BD, BE, BF, and BG denote even-order constants and BOC, BOD, BOE, BOF, and BOG odd-order constants. Since odd-order terms are introduced, the curved line extending between the centers of curvature of the cross section in the sub scanning direction is asymmetric with respect to the optical axis. Thus, the field curvature in the sub scanning direction that occurs asymmetrically can be highly compensated.

In addition, fm is defined by the following Formula 10 and indicates a value proportional to the scanning speed on an image surface and a value corresponding to the focal length in the main scanning direction in the second imaging optical system when a light beam from the first imaging optical system is a parallel light beam with respect to the main scanning direction. As shown in FIG. 1, $Y_0$ (mm) denotes an effective scanning width and $\theta_0$ (deg) represents a deflection angle corresponding to the effective scanning width $Y_0$.

[Formula 10]

$$fm = \frac{180 \cdot Y_0}{\pi \cdot \theta_0}$$

Next, specific values of respective examples are shown in the following Tables 1 to 7. Reference character L represents the distance between the deflecting/reflecting surface and the surface 7 to be scanned and V indicates the distance between the vertex of the plane on the outgoing side of the correcting lens 6 and the surface 7 to be scanned (FIG. 1). Reference character TH denotes the central thickness of the correcting lens 6. The refractive index of the glass material is 1.51933 and the design wavelength is 788 nm. A unit of mm is used for expressing each of $Y_0$, rp, $\Delta X$, L, d, TH, RDy1, RDy2, and RDs and a unit of degree is employed for expressing $\theta_0$.

TABLE 1

First Example

| | | | | | | |
|---|---|---|---|---|---|---|
| fm | 136 | $Y_0$ | 220 | $\theta_0$ | 92.684 | |
| rp | 7 | $\Delta X$ | 2.02 | $\alpha$ | 60 | |
| L | 174.72 | d | 136.52 | TH | 13 | |

| | | | | | | | | | |
|---|---|---|---|---|---|---|---|---|---|
| RDy1 | 130.00 | K1 | 0.00000 | AD1 | $-7.06109 \times 10^{-6}$ AE1 | $8.35462 \times 10^{-9}$ AF1 | $-6.36630 \times 10^{-12}$ AG1 | $1.67960 \times 10^{-15}$ |
| RDy2 | -118.50 | K2 | 0.00000 | AD2 | $-2.99440 \times 10^{-6}$ AE2 | $1.96580 \times 10^{-10}$ AF2 | $1.51940 \times 10^{-12}$ AG2 | $-1.29090 \times 10^{-15}$ |
| RDs | -14.09 | BC | $3.11630 \times 10^{-4}$ | BD | $-4.88770 \times 10^{-7}$ BE | $5.00030 \times 10^{-10}$ BF | $-2.94170 \times 10^{-13}$ BG | 0.00000 |
| | | BOC | $-1.22750 \times 10^{-3}$ | BOD | $1.64820 \times 10^{-7}$ BOE | $1.08000 \times 10^{-10}$ BOF | 0.00000 BOG | 0.00000 |

TABLE 2

Second Example

| | | | | | | |
|---|---|---|---|---|---|---|
| fm | 136 | $Y_0$ | 220 | $\theta_0$ | 92.684 | |
| rp | 7 | $\Delta X$ | 2.11 | $\alpha$ | 60 | |
| L | 156.00 | d | 113.69 | TH | 11 | |

| | | | | | | | | | |
|---|---|---|---|---|---|---|---|---|---|
| RDy1 | 57.19 | K1 | 0.00000 | AD1 | $-9.61152 \times 10^{-6}$ AE1 | $5.15635 \times 10^{-9}$ AF1 | $-1.52966 \times 10^{-12}$ AG1 | $2.05110 \times 10^{-16}$ |
| RDy2 | 116.13 | K2 | 0.00000 | AD2 | $-6.39830 \times 10^{-6}$ AE2 | $2.19120 \times 10^{-10}$ AF2 | $-3.77540 \times 10^{-13}$ AG2 | $9.97540 \times 10^{-17}$ |
| RDs | -14.98 | BC | $0.65040 \times 10^{-4}$ | BD | $-6.83760 \times 10^{-7}$ BE | $3.09570 \times 10^{-10}$ BF | $-2.82800 \times 10^{-14}$ BG | 0.00000 |
| | | BOC | $9.12150 \times 10^{-4}$ | BOD | $2.64660 \times 10^{-7}$ BOE | $-6.71680 \times 10^{-10}$ BOF | 0.00000 BOG | 0.00000 |

TABLE 3

Third Example

| | | | | | | |
|---|---|---|---|---|---|---|
| fm | 136 | $Y_0$ | 220 | $\theta_0$ | 92.684 | |
| rp | 7 | $\Delta X$ | 2.77 | $\alpha$ | 90 | |
| L | 156.00 | d | 113.69 | TH | 11 | |

| | | | | | | | | | |
|---|---|---|---|---|---|---|---|---|---|
| RDy1 | 57.19 | K1 | 0.00000 | AD1 | $-9.60671 \times 10^{-6}$ AE1 | $5.15991 \times 10^{-9}$ AF1 | $-1.52960 \times 10^{-12}$ AG1 | $2.04475 \times 10^{-16}$ |
| RDy2 | 117.72 | K2 | 0.00000 | AD2 | $-6.38530 \times 10^{-6}$ AE2 | $2.19750 \times 10^{-9}$ AF2 | $-3.78200 \times 10^{-13}$ AG2 | $9.96390 \times 10^{-17}$ |
| RDs | -14.98 | BC | $6.44410 \times 10^{-4}$ | BD | $-6.55950 \times 10^{-7}$ BE | $2.91750 \times 10^{-10}$ BF | $-2.40930 \times 10^{-14}$ BG | 0.00000 |
| | | BOC | $-9.84910 \times 10^{-4}$ | BOD | $2.06910 \times 10^{-7}$ BOE | $-5.11530 \times 10^{-11}$ BOF | 0.00000 BOG | 0.00000 |

TABLE 4

Fourth Example

| fm | 136 | $Y_0$ | 220 | $\theta_0$ | 92.684 | | | | |
|---|---|---|---|---|---|---|---|---|---|
| rp | 12 | $\Delta X$ | 3.17 | $\alpha$ | 60 | | | | |
| L | 156.00 | d | 113.69 | TH | 11 | | | | |

| | | | | | | | | | |
|---|---|---|---|---|---|---|---|---|---|
| RDy1 | 57.19 | K1 | 0.00000 | AD1 | $-9.60378 \times 10^{-6}$ | AE1 | $5.16214 \times 10^{-9}$ | AF1 | $-1.53054 \times 10^{-12}$ AG1 $2.04859 \times 10^{-16}$ |
| RDy2 | 116.98 | K2 | 0.00000 | AD2 | $-6.38110 \times 10^{-6}$ | AE2 | $2.19770 \times 10^{-9}$ | AF2 | $-3.74620 \times 10^{-13}$ AG2 $9.84700 \times 10^{-17}$ |
| RDs | $-14.98$ | BC | $6.37120 \times 10^{-4}$ | BD | $-6.57010 \times 10^{-7}$ | BE | $2.97110 \times 10^{-10}$ | BF | $-2.60510 \times 10^{-14}$ BG $0.00000$ |
| | | BOC | $-1.39810 \times 10^{-3}$ | BOD | $3.28890 \times 10^{-7}$ | BOE | $-8.21910 \times 10^{-11}$ | BOF | $0.00000$ BOG $0.00000$ |

TABLE 5

Fifth Example

| fm | 136 | $Y_0$ | 220 | $\theta_0$ | 92.684 |
|---|---|---|---|---|---|
| rp | 17 | $\Delta X$ | 4.33 | $\alpha$ | 60 |
| L | 156.00 | d | 113.69 | TH | 11 |

| | | | | | | | | | |
|---|---|---|---|---|---|---|---|---|---|
| RDy1 | 57.19 | K1 | 0.00000 | AD1 | $-9.58831 \times 10^{-6}$ | AE1 | $5.16672 \times 10^{-9}$ | AF1 | $-1.53137 \times 10^{-12}$ AG1 $2.04864 \times 10^{-16}$ |
| RDy2 | 117.97 | K2 | 0.00000 | AD2 | $-6.36350 \times 10^{-6}$ | AE2 | $2.20650 \times 10^{-9}$ | AF2 | $-3.74990 \times 10^{-13}$ AG2 $9.85710 \times 10^{-17}$ |
| RDs | $-14.98$ | BC | $6.08790 \times 10^{-4}$ | BD | $-6.29350 \times 10^{-7}$ | BE | $2.83700 \times 10^{-10}$ | BF | $-2.34200 \times 10^{-14}$ BG $0.00000$ |
| | | BOC | $-1.88150 \times 10^{-3}$ | BOD | $4.07540 \times 10^{-7}$ | BOE | $-1.05680 \times 10^{-11}$ | BOF | $0.00000$ BOG $0.00000$ |

TABLE 6

Sixth Example

| fm | 136 | $Y_0$ | 220 | $\theta_0$ | 92.684 |
|---|---|---|---|---|---|
| rp | 12 | $\Delta X$ | 2.00 | $\alpha$ | 60 |
| L | 156.00 | d | 114.00 | TH | 11 |

| | | | | | | | | | |
|---|---|---|---|---|---|---|---|---|---|
| RDy1 | 56.86 | K1 | 0.00000 | AD1 | $-7.05933 \times 10^{-6}$ | AE1 | $5.15295 \times 10^{-9}$ | AF1 | $-1.56016 \times 10^{-12}$ AG1 $2.11688 \times 10^{-16}$ |
| RDy2 | 116.31 | K2 | 0.00000 | AD2 | $-6.22070 \times 10^{-6}$ | AE2 | $2.19760 \times 10^{-9}$ | AF2 | $-3.75530 \times 10^{-13}$ AG2 $9.46200 \times 10^{-17}$ |
| RDs | $-14.89$ | BC | $6.62040 \times 10^{-4}$ | BD | $-6.22190 \times 10^{-7}$ | BE | $3.15320 \times 10^{-10}$ | BF | $-3.24620 \times 10^{-14}$ BG $0.00000$ |
| | | BOC | $-9.49230 \times 10^{-4}$ | BOD | $6.69330 \times 10^{-8}$ | BOE | $9.57720 \times 10^{-12}$ | BOF | $0.00000$ BOG $0.00000$ |

TABLE 7

Seventh Example

| fm | 136 | $Y_0$ | 220 | $\theta_0$ | 92.684 |
|---|---|---|---|---|---|
| rp | 12 | $\Delta X$ | 4.84 | $\alpha$ | 60 |
| L | 156.00 | d | 113.97 | TH | 11 |

| | | | | | | | | | |
|---|---|---|---|---|---|---|---|---|---|
| RDy1 | 55.73 | K1 | 0.00000 | AD1 | $-9.63793 \times 10^{-6}$ | AE1 | $5.17063 \times 10^{-9}$ | AF1 | $-1.53500 \times 10^{-12}$ AG1 $2.04122 \times 10^{-16}$ |
| RDy2 | 110.95 | K2 | 0.00000 | AD2 | $-6.30090 \times 10^{-6}$ | AE2 | $2.18690 \times 10^{-9}$ | AF2 | $-3.71100 \times 10^{-13}$ AG2 $1.03520 \times 10^{-16}$ |
| RDs | $-14.32$ | BC | $6.99720 \times 10^{-4}$ | BD | $-6.93720 \times 10^{-7}$ | BE | $3.12750 \times 10^{-10}$ | BF | $-2.58540 \times 10^{-14}$ BG $0.00000$ |
| | | BOC | $-2.38770 \times 10^{-3}$ | BOD | $7.94940 \times 10^{-7}$ | BOE | $-2.10500 \times 10^{-10}$ | BOF | $0.00000$ BOG $0.00000$ |

FIGS. 2 to 6 show the residual fθ errors and the amounts of field curvature in respective optical scanners of the above-mentioned examples. FIG. 2A and FIG. 2B show the fθ errors and the amount of field curvature in the first example, respectively. FIG. 3A and FIG. 3B show the fθ errors and the amount of field curvature in the second example, respectively. FIG. 4A and FIG. 4B show the fθ errors and the amount of field curvature in the third example, respectively. FIG. 5A and FIG. 5B show the fθ errors and the amount of field curvature in the fourth example, respectively. Similarly, FIG. 6A and FIG. 6B show the fθ errors and the amount of field curvature in the fifth example, respectively.

Figure 7B:
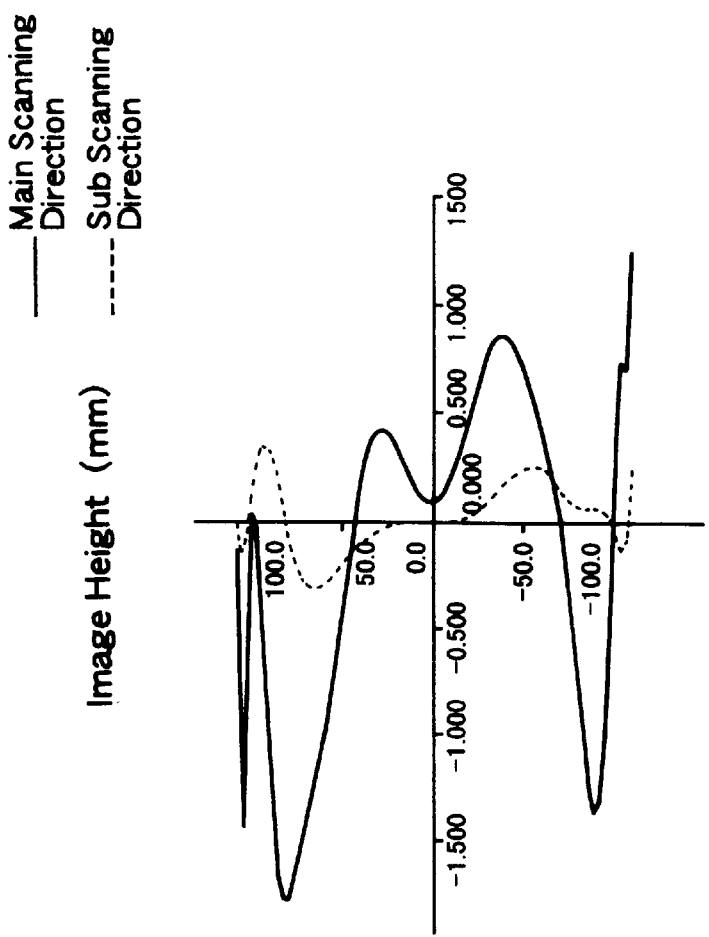
FIG. 7B shows amounts of field curvature in the optical scanner according to the sixth example of the present invention.
Figure 7A:
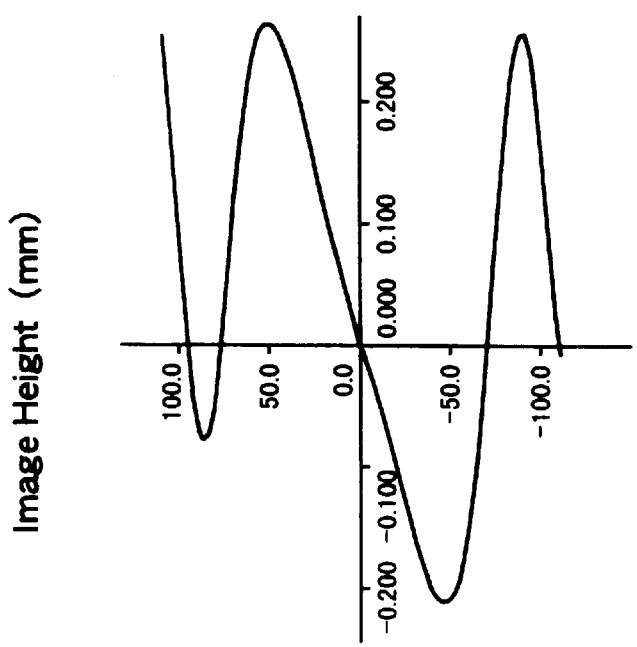
FIG. 7A shows the fθ errors in an optical scanner according to a sixth example of the present invention.
Figure 8B:
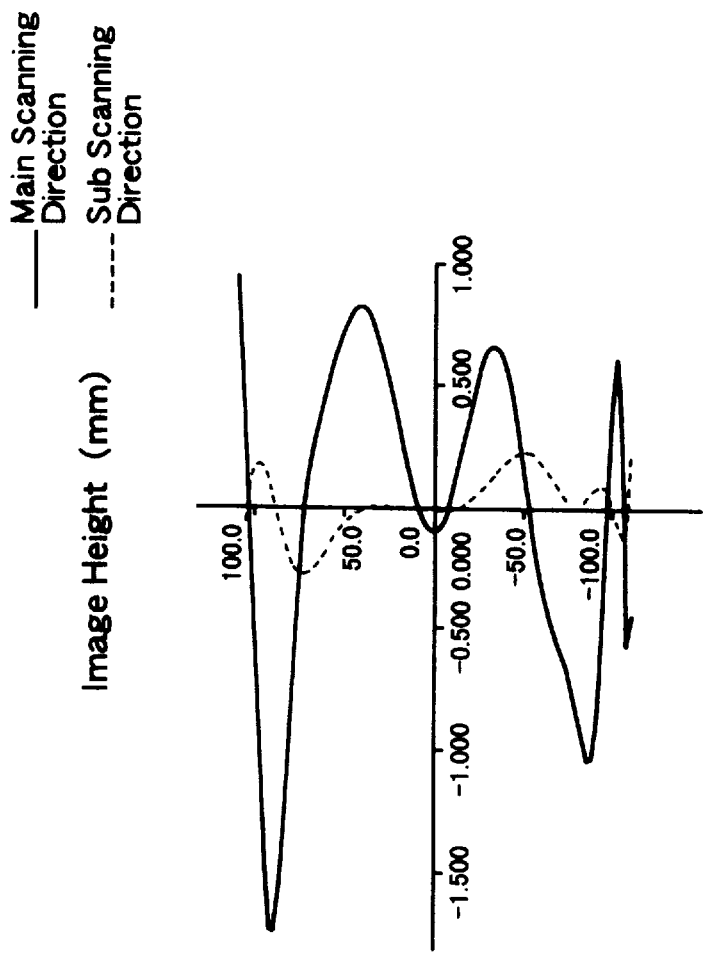
FIG. 8B shows amounts of field curvature in the optical scanner according to the seventh example of the present invention.
Figure 8A:
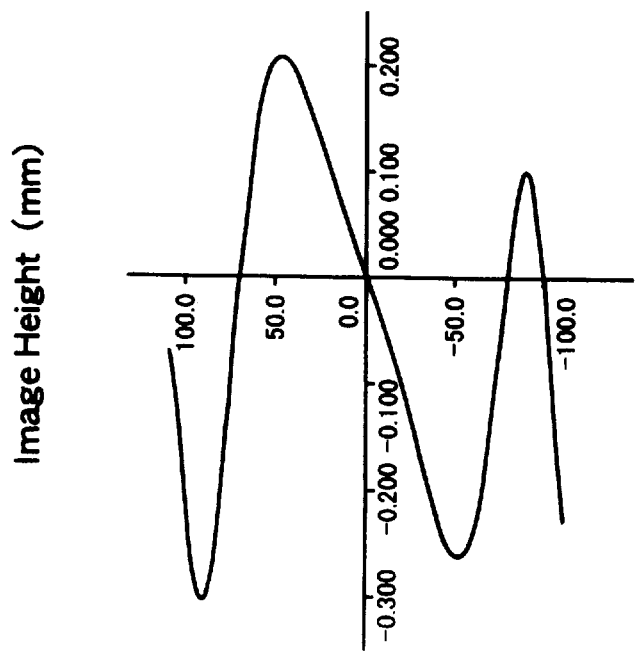
FIG. 8A shows the fθ errors in an optical scanner according to a seventh example of the present invention.

Further, FIG. 7A and FIG. 7B show the fθ errors and the amount of field curvature in the sixth example, respectively and FIG. 8A and FIG. 8B show the fθ errors and the amount of field curvature in the seventh example, respectively. In each figure, the solid line indicates the main scanning direction and the broken line the sub scanning direction. It can be seen from FIGS. 2 to 8 that the field curvature and the fθ characteristics are compensated excellently.

The following Tables 8 and 9 show first and second comparative examples in which the shift amount ΔX of the polygon mirror 4 exceeds the range of the conditional expression.

TABLE 8

First Comparative Example

| | fm | 136 | $Y_0$ | 220 | $\theta_0$ | 92.684 | | | | | |
|---|---|---|---|---|---|---|---|---|---|---|---|
| | rp | 12 | $\Delta X$ | 1.00 | $\alpha$ | 60 | | | | | |
| | L | 156.00 | d | 116.27 | TH | 11 | | | | | |
| RDy1 | 58.04 | K1 | 0.00000 | AD1 | $-9.23803 \times 10^{-6}$ | AE1 | $5.03084 \times 10^{-9}$ | AF1 | $-1.63717 \times 10^{-12}$ | AG1 | $2.51057 \times 10^{-16}$ |
| RDy2 | 131.79 | K2 | 0.00000 | AD2 | $-5.71090 \times 10^{-6}$ | AE2 | $1.97010 \times 10^{-9}$ | AF2 | $-4.78140 \times 10^{-13}$ | AG2 | $1.35280 \times 10^{-16}$ |
| RDs | −14.30 | BC | $7.23050 \times 10^{-4}$ | BD | $-7.08390 \times 10^{-7}$ | BE | $3.14980 \times 10^{-10}$ | BF | $-3.50380 \times 10^{-14}$ | BG | 0.00000 |
| | | BOC | $-5.34050 \times 10^{-4}$ | BOD | $-3.50020 \times 10^{-7}$ | BOE | $2.13760 \times 10^{-10}$ | BOF | 0.00000 | BOG | 0.00000 |

TABLE 9

Second Comparative Example

| | fm | 136 | $Y_0$ | 220 | $\theta_0$ | 92.684 | | | | | |
|---|---|---|---|---|---|---|---|---|---|---|---|
| | rp | 12 | $\Delta X$ | 6.00 | $\alpha$ | 60 | | | | | |
| | L | 153.49 | d | 116.13 | TH | 11 | | | | | |
| RDy1 | 57.92 | K1 | 0.00000 | AD1 | $-9.09589 \times 10^{-6}$ | AE1 | $5.08632 \times 10^{-9}$ | AF1 | $-1.61684 \times 10^{-12}$ | AG1 | $2.50309 \times 10^{-16}$ |
| RDy2 | 132.21 | K2 | 0.00000 | AD2 | $-5.54000 \times 10^{-6}$ | AE2 | $1.92010 \times 10^{-9}$ | AF2 | $-3.89320 \times 10^{-13}$ | AG2 | $1.36590 \times 10^{-16}$ |
| RDs | −13.56 | BC | $7.32700 \times 10^{-4}$ | BD | $-6.70990 \times 10^{-7}$ | BE | $2.78470 \times 10^{-10}$ | BF | $-1.08560 \times 10^{-14}$ | BG | 0.00000 |
| | | BOC | $-3.44530 \times 10^{-3}$ | BOD | $1.22930 \times 10^{-6}$ | BOE | $-3.06500 \times 10^{-10}$ | BOF | 0.00000 | BOG | 0.00000 |

Figure 9B:
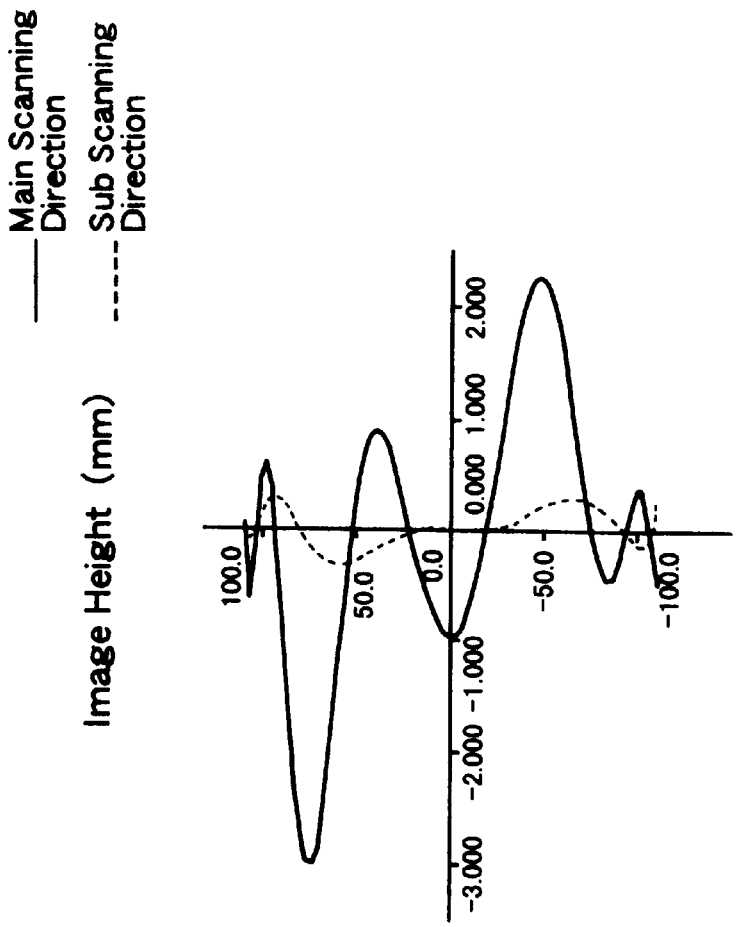
FIG. 9B shows amounts of field curvature in the optical scanner according to the first comparative example of the present invention.
Figure 9A:
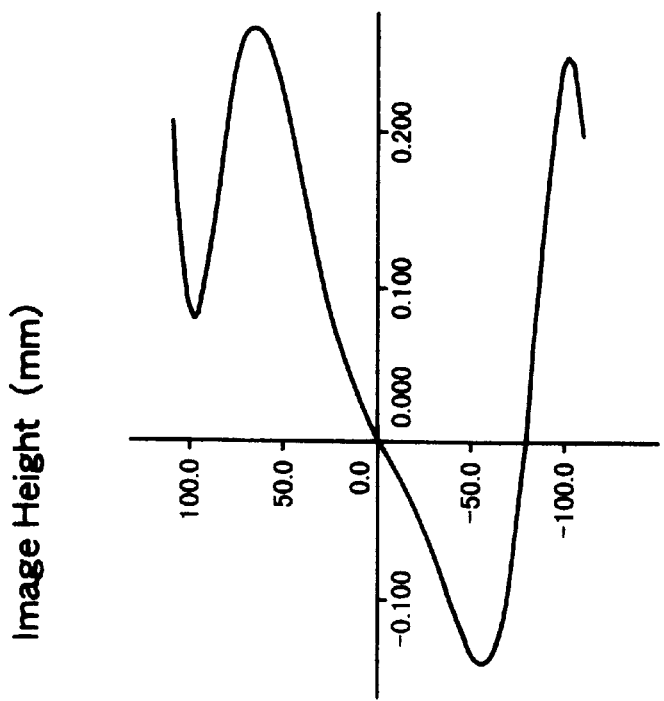
FIG. 9A shows the fθ errors in an optical scanner according to a first comparative example of the present invention.
Figure 10B:
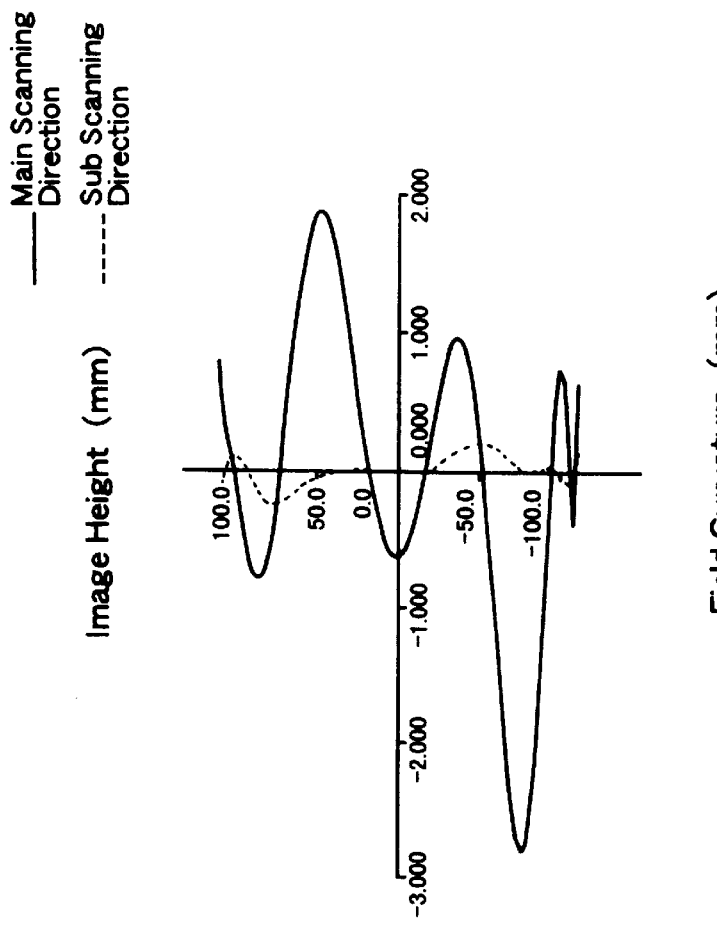
FIG. 10B shows amounts of field curvature in the optical scanner according to the second comparative example of the present invention.
Figure 10A:
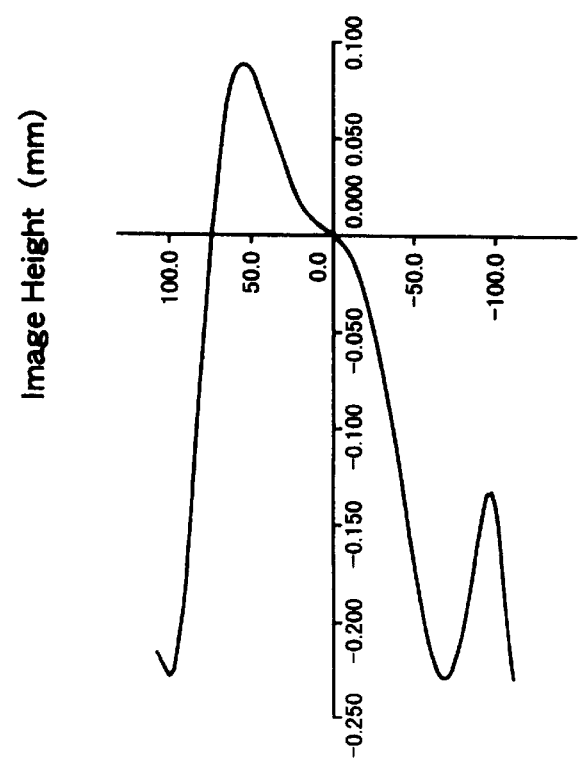
FIG. 10A shows the fθ errors in an optical scanner according to a second comparative example of the present invention.

FIG. 9A and FIG. 9B show the fθ errors and the amount of field curvature in the first comparative example, respectively and FIG. 10A and FIG. 10B show the fθ errors and the amount of field curvature in the second comparative example, respectively. In each figure, the solid line indicates the main scanning direction and the broken line the sub scanning direction. It can be seen from FIGS. 9 and 10 that the maximum field curvature in the main scanning direction reaches 3 mm and therefore a high resolution cannot be achieved.

In the present embodiment, Formulae 6 to 9 are used for expressing the shapes of correcting lenses. However, other formulae may be used as long as they can express the same shapes.

Second Embodiment

Figure 11:
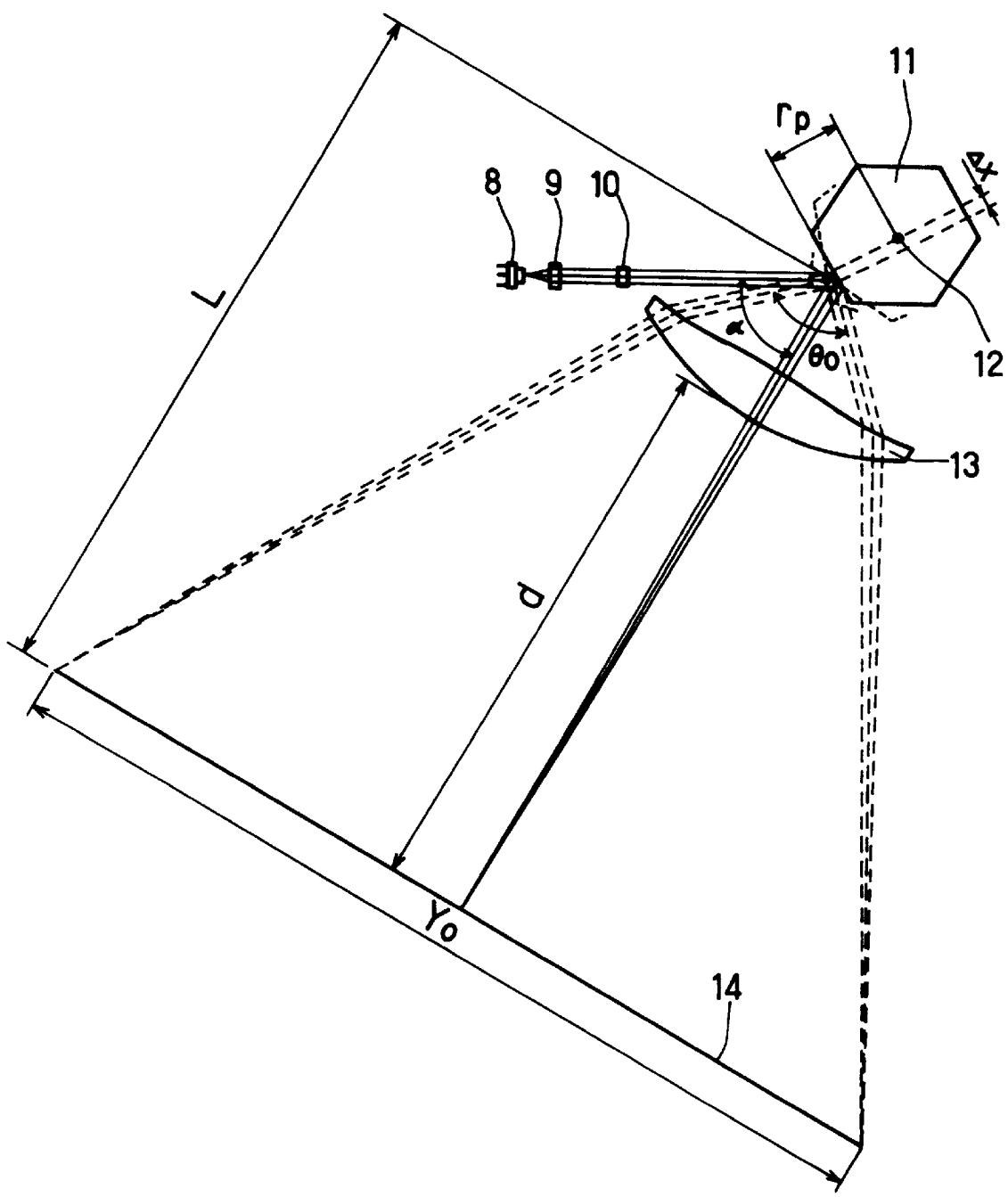
FIG. 11 is a structural view showing an optical scanner according to a second embodiment of the present invention.

FIG. 11 shows a structural view of an optical scanner according to a second embodiment. The optical scanner shown in the figure includes: a semiconductor laser 8 as a light source; an axisymmetric lens 9; a polygon mirror 11 with six deflecting planes as an optical deflector for scanning a light beam from the semiconductor laser 8; a cylindrical lens 10 as a first imaging optical system that has a refractive power in the sub scanning direction and that is positioned between the semiconductor laser 8 and the polygon mirror 11; and a correcting lens 13 as a second imaging optical system formed of one correcting lens. Numerals 12 and 14 indicate a rotation central axis of the polygon mirror 11 and a surface to be scanned.

The plane on the outgoing side of the correcting lens 13 is a curved-axis toric surface in which the line extending between the centers of curvature of the cross section in the sub scanning direction is a curved line. The plane of incidence of the correcting lens 13 is an aspheric cylindrical plane having a refractive power only in the main scanning direction and a cross sectional shape in the main scanning direction having high-order expansion terms of at least fourth order. The polygon mirror 11 is positioned so that the reflecting point at the scanning center is shifted in the direction moving away from the center of the deflecting plane and from the semiconductor laser 8 within the range in which a light beam is not omitted in the vicinity of the edge of the deflecting plane.

The operation of the optical scanner with the above-mentioned configuration is described as follows. A light beam from the semiconductor laser 8 is converted into a parallel light beam, a convergent light beam, or a divergent light beam by the axisymmetric lens 9, which enters into the cylindrical lens 10 and is focused in the vicinity of the reflecting surface of the polygon mirror 11 with respect to the sub scanning direction. The polygon mirror 11 rotates about the rotation central axis 12 and deflects the incident laser beam. The deflected beam is focused on the surface 14 to be scanned by the correcting lens 13, thus scanning the surface 14 to be scanned.

The correcting lens 13 is positioned so that the deflection point and the surface 14 to be scanned have a geometrical-optical conjugate relationship in the sub scanning direction. The correcting lens 13 compensates for the tilt of the surface of the polygon mirror 11. In addition, the correcting lens 13 also compensates for the field curvature and the fθ characteristics. The polygon mirror 11 has six planes, thus achieving a higher speed.

In the present embodiment, since the polygon mirror with six planes is used in order to achieve a higher speed, the effective area in each plane is small. Therefore, when the asymmetry in field curvature in the main scanning direction caused by the oblique incidence of light onto the deflecting/reflecting surface and in fθ characteristics are sought to be compensated merely by the shift of the polygon mirror 11 as in the first embodiment, the area required for the reflection of a light beam exceeds the effective area of the deflecting plane.

Therefore, the shift amount ΔX in the present embodiment is determined so that a light beam is reflected within the effective area of the deflecting plane, i.e. in the range in which the light beam is not omitted in the vicinity of the edge of the deflecting plane. Further, the residual asymmetry is compensated by forming the plane on the outgoing side of the correcting lens in an asymmetrical shape in which odd-order terms are introduced with respect to the main scanning direction as shown in Formulae 12, 13, and 14 described later.

As described above, according to the present embodiment, the polygon mirror is shifted within a practicable range, and the correcting lens is formed so as to have an aspheric cylindrical plane as the plane of incidence and a curved-axis toric surface as the plane on the outgoing side. Therefore, the correcting lens can be processed easily and the field curvature and the fθ characteristics can be compensated excellently using one correcting lens, thus obtaining an optical scanner with a high resolution at a low cost.

Examples are described as follows. The shape of the plane of incidence in the correcting lens 13 in each example is an aspheric cylindrical plane having a refractive power only in the main scanning direction. With the premise that the vertex of the plane is the origin and the direction in which an incident beam of light travels forward is positive, the sag Z (mm) from the vertex at a point with the coordinate y (mm) in the main scanning direction is expressed by the following Formula 11:

[Formula 11]

$$Z = \frac{\left(\frac{1}{RDy1}\right)y^2}{1+\sqrt{1-(1+K1)\left(\frac{1}{RDy1}\right)^2 y^2}} + AD1y^4 + AE1y^6 + AF1y^8 + AG1y^{10}$$

The plane on the outgoing side of the correcting lens 13 is a curved-axis toric surface in which the line extending between the centers of curvature of the cross section in the sub scanning direction is a curved line. With the premise that the vertex of the surface is the origin and the direction in which an incident beam of light travels forward is positive, the sag Z (mm) from the vertex at a point with the coordinate x (mm) in the sub scanning direction and the coordinate y (mm) in the main scanning direction is expressed by the following Formula 12:

[Formula 12]

$$Z = P(y) + \frac{\frac{x^2}{RDx2}}{1+\sqrt{1-\left(\frac{x}{RDx2}\right)^2}}$$

P(y) is expressed by the following Formula 13.

[Formula 13]

$$P(y) = \frac{\left(\frac{y^2}{RDy2}\right)}{1+\sqrt{1-(1+K2)\left(\frac{y}{RDy2}\right)^2}} + AD2y^4 + AE2y^6 + AF2y^8 + AG2y^{10} + AOD2y^3 + AOE2y^5 + AOF2y^7 + AOG2y^9$$

RDx2 is expressed by the following Formula 14.

[Formula 14]

$$RDx2 = RDs\,(1+BC_y{}^2+BD_y{}^4+BE_y{}^6+BF_y{}^8+BG_y{}^{10}+BOC_y+BODE_y{}^3+BOE_y{}^5+BOF_y{}^7+BOG_y{}^9)$$

In the above, P(y) expresses a non-arc that is the cross sectional shape in the main scanning direction including an optical axis, Rdy2 (mm) indicates the radius of curvature in the main scanning direction, K2 represents a conic constant contributing in the main scanning direction, AD2, AE2, AF2, and AG2 denote even-order constants contributing in the main scanning direction, and AOD2, AOE2, AOF2, and AOG2 represent odd-order constants. RDx2 expresses a function indicating the radius of curvature in the sub scanning direction at each point on the y coordinate, RDs (mm) represents the radius of curvature in the sub scanning direction at the center, BC, BD, BE, BF, and BG denote even-order constants and BOC, BOD, BOE, BOF, and BOG odd-order constants. Since odd-order terms are introduced, the curved line extending between the centers of curvature of the cross section in the sub scanning direction is asymmetric with respect to the optical axis. Thus, the field curvature in the sub scanning direction that occurs asymmetrically can be highly compensated.

Next, specific values in respective examples are shown in the following tables. In the tables, $\Delta X$ indicates a shift amount of the polygon mirror 11; a an angle of incidence in the polygon mirror 11; rp the radius of an inscribed circle; L the distance between the deflecting/reflecting surface and the surface 14 to be scanned; d the distance between the vertex of the plane on the outgoing side of the correcting lens 13 and the surface 14 to be scanned; $Y_0$ an effective scanning width; and $\theta_0$ a deflection angle corresponding to the effective scanning width $Y_0$ (FIG. 11). Reference character TH denotes the central thickness of the correcting lens. The refractive index of the glass material is 1.51933 and the design wavelength is 788 nm. A unit of mm is used for expressing each of $Y_0$, rp, AX, L, d, TH, RDy1, RDy2, and RDs and a unit of degree is employed for expressing $\theta_0$. In addition, fm is a value defined in the above-mentioned Formula 10.

TABLE 10

Eighth Example

| | fm | 136 | $Y_0$ | 220 | $\theta_0$ | 92.684 | | | | |
| | rp | 17.32 | $\Delta X$ | 1.35 | $\alpha$ | 60 | | | | |
| | L | 173.95 | d | 134.94 | TH | 13 | | | | |
| RDy1 | 130.00 | K1 | 0.00000 | AD1 | $-7.22467 \times 10^{-6}$ | AE1 | $8.33401 \times 10^{-9}$ | AF1 | $-6.34100 \times 10^{-12}$ | AG1 | $1.66073 \times 10^{-15}$ |
| RDy2 | -125.19 | K2 | 0.00000 | AD2 | $-3.12230 \times 10^{-6}$ | AE2 | $1.72610 \times 10^{-10}$ | AF2 | $1.51500 \times 10^{-12}$ | AG2 | $-1.29780 \times 10^{-15}$ |
| | | | | AOD2 | $7.79550 \times 10^{-7}$ | AOE2 | $-2.16240 \times 10^{-9}$ | AOF2 | $1.05740 \times 10^{-12}$ | AOG2 | $-1.44290 \times 10^{-16}$ |
| RDs | -14.32 | BC | $2.69830 \times 10^{-4}$ | BD | $-4.65580 \times 10^{-7}$ | BE | $4.68770 \times 10^{-10}$ | BF | $-2.79740 \times 10^{-13}$ | BG | 0.00000 |
| | | BOC | $-7.86940 \times 10^{-4}$ | BOD | $-4.55140 \times 10^{-7}$ | BOE | $3.60770 \times 10^{-10}$ | BOF | 0.00000 | BOG | 0.00000 |

TABLE 11

Ninth Example

| | fm | 150 | $Y_0$ | 220 | $\theta_0$ | 84.034 |
|---|---|---|---|---|---|---|
| | rp | 17.32 | $\Delta X$ | 2.00 | $\alpha$ | 60 |
| | L | 197.56 | d | 153.69 | TH | 12 |

| | | | | | | | | | | | |
|---|---|---|---|---|---|---|---|---|---|---|---|
| RDy1 | 143.38 | K1 | 0.00000 | AD1 | $-5.29488 \times 10^{-6}$ | AE1 | $1.76809 \times 10^{-9}$ | AF1 | $-2.74120 \times 10^{-12}$ | AG1 | $5.47923 \times 10^{-16}$ |
| RDy2 | $-128.38$ | K2 | 0.00000 | AD2 | $-2.77220 \times 10^{-6}$ | AE2 | $4.02660 \times 10^{-10}$ | AF2 | $7.16770 \times 10^{-13}$ | AG2 | $-5.78420 \times 10^{-16}$ |
| | | | | AO | $-4.02730 \times 10^{-7}$ | AO | $2.94030 \times 10^{-11}$ | AO | 0.00000 | AO | 0.00000 |
| | | | | D2 | | E2 | | F2 | | G2 | |
| RDs | $-16.44$ | BC | $1.90590 \times 10^{-4}$ | BD | $-3.22130 \times 10^{-7}$ | BE | $2.77950 \times 10^{-10}$ | BF | $-1.34350 \times 10^{-13}$ | BG | 0.00000 |
| | | BOC | $-8.70250 \times 10^{-4}$ | BOD | $-1.50580 \times 10^{-7}$ | BOE | $1.63840 \times 10^{-10}$ | BOF | 0.00000 | BOG | 0.00000 |

Figure 12B:
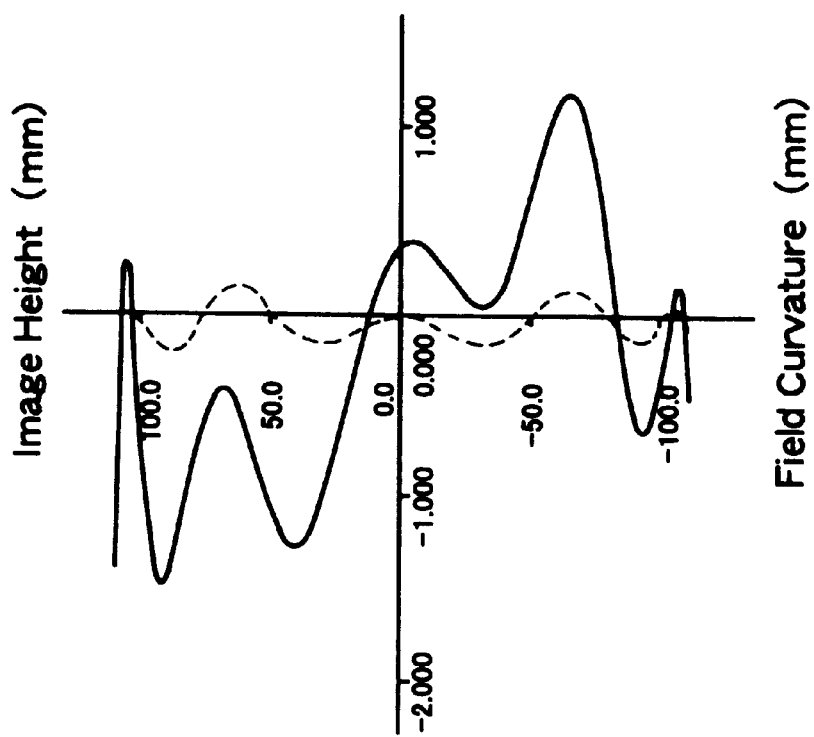
FIG. 12B shows amounts of field curvature in the optical scanner according to the eighth example of the present invention.
Figure 12A:
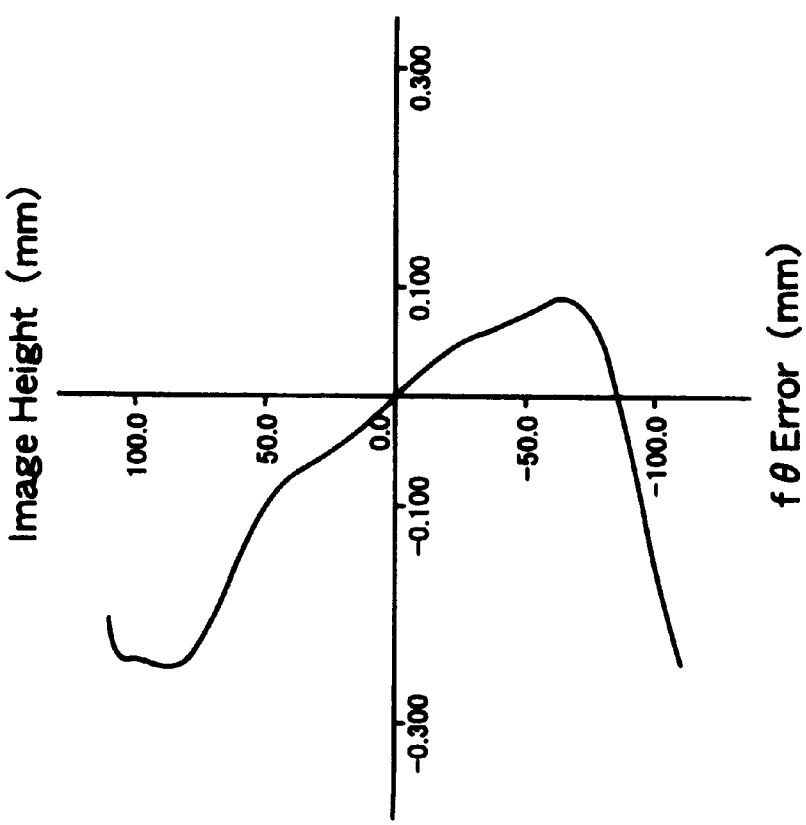
FIG. 12A shows the fθ errors in an optical scanner according to an eighth example of the present invention.
Figure 13B:
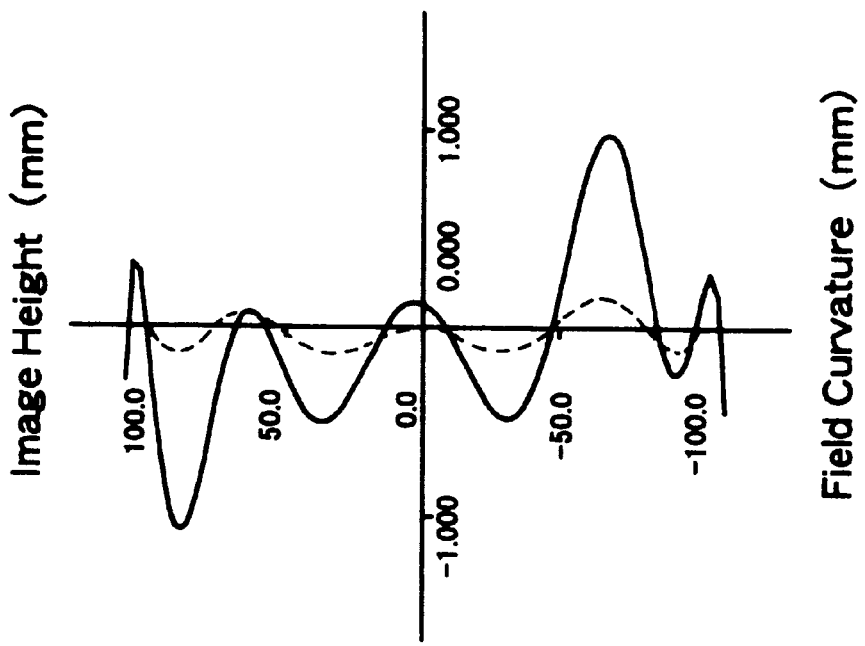
FIG. 13B shows amounts of field curvature in the optical scanner according to the ninth example of the present invention.
Figure 13A:
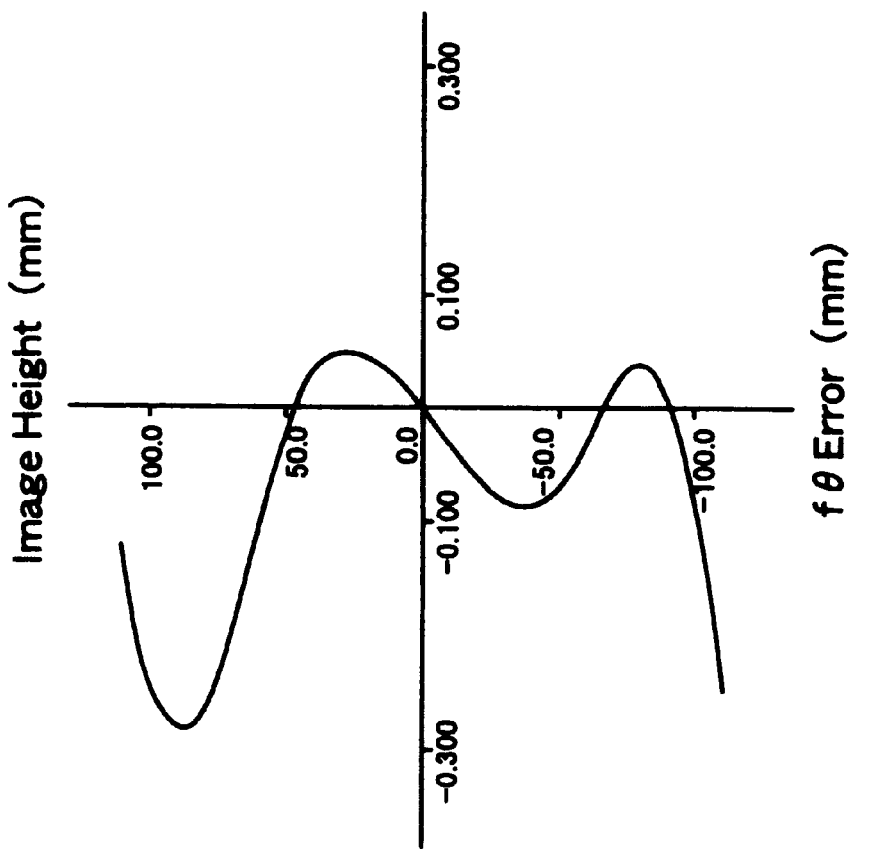
FIG. 13A shows the fθ errors in an optical scanner according to a ninth example of the present invention.

FIGS. 12 and 13 show the residual fθ errors and the amounts of field curvature in the optical scanners in the above-mentioned examples. FIG. 12A and FIG. 12B show the fθ errors and the amount of field curvature in the eighth example, respectively. FIG. 13A and FIG. 13B show the fθ errors and the amount of field curvature in the ninth example, respectively. In each figure, the solid line indicates the main scanning direction and the broken line the sub scanning direction. It can be seen from FIGS. 12 and 13 that the field curvature and the fθ characteristics are compensated excellently.

In the present embodiment, Formulae 11 to 14 are used for expressing the shapes of correcting lenses. However, other formulae may be used as long as they can express the same shapes.

Third Embodiment

Figure 14:
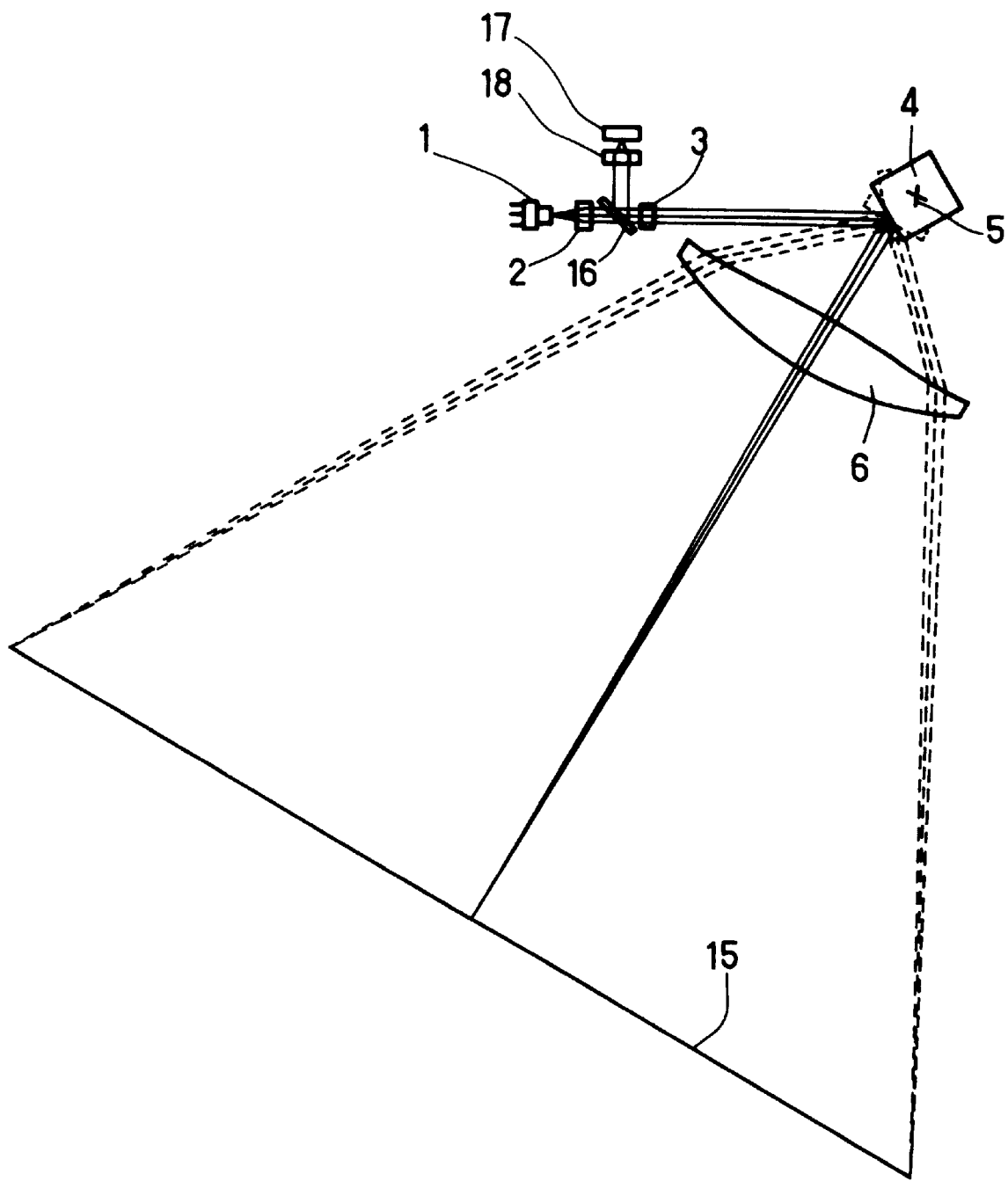
FIG. 14 is a schematic structural view of an embodiment of image reading apparatuses using an optical scanner of the present invention.

FIG. 14 is a schematic view showing an image reading apparatus using an optical scanner according to the first embodiment. The same members as in the optical scanner of the first embodiment shown in FIG. 1 are indicated with the same numbers and the descriptions thereof are omitted. The image reading apparatus according to the present embodiment is provided with a surface 15 to be read, a half mirror 16, a detector 17, and a detecting optical system 18.

The half mirror 16 transmits a light beam from a semiconductor laser 1 and reflects the returned light from the surface 15 to the detecting optical system 18. The detecting optical system 18 leads the returned light to the detector 17. In the image reading apparatus of the present embodiment, an optical scanner according to the first or second embodiment is used, thus achieving a small size, a low cost, and a high resolution.

In this embodiment, an example using the optical scanner according to the first embodiment shown in FIG. 1 was shown. However, the optical scanner according to the second embodiment shown in FIG. 11 may be used.

Fourth Embodiment

Figure 15:
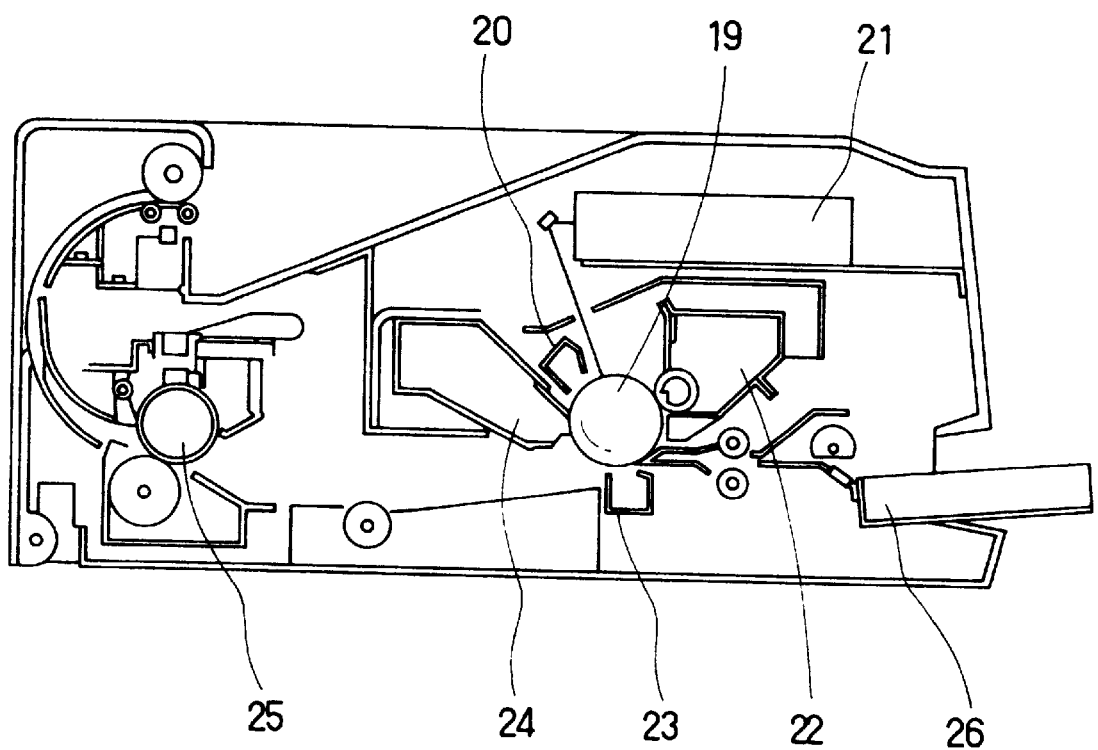
FIG. 15 is a schematic cross sectional view of an embodiment of image forming apparatuses using an optical scanner of the present invention.

FIG. 15 is a schematic view showing an image forming apparatus using an optical scanner according to the first embodiment. The image forming apparatus shown in the figure is provided with the optical scanner 21 of the first embodiment shown in FIG. 1. The optical scanner 21 writes printing information on a photosensitive drum 19. The surface of the photosensitive drum 19 is coated with a photoreceptor in which the electric charge varies by light beam irradiation. A primary electrification unit 20 allows electrostatic ions to adhere to the surface of the photoreceptor, thus electrifying the photoreceptor. By a developing unit 22, a charged toner adheres to printing parts.

The toner that has adhered to the printing parts is transferred to a sheet of paper fed from a paper feed cassette 26 by a transfer electrification unit 23. The transferred toner is fixed on the sheet of paper by a fixing unit 25. Residual toner is removed by a cleaner 24. In the image forming apparatus of the present embodiment, an optical scanner according to the first or second embodiment is used, thus achieving a small size, a low cost, and a high resolution.

In this embodiment, an example using the optical scanner according to the first embodiment shown in FIG. 1 was shown. However, the optical scanner according to the second embodiment shown in FIG. 11 may be used.

As described above, according to an optical scanner of the present invention, a polygon mirror is shifted by an optimum amount and a correcting lens is formed to have a shape that can be processed with relative ease, thus compensating for the field curvature and the fθ characteristics excellently. Consequently, an optical scanner with a high resolution can be obtained at a low cost.

Furthermore, according to the image reading apparatus or the image forming apparatus of the present invention, an optical scanner according to the present invention is used, thus achieving a small size, a low cost, and a high resolution.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical scanner, comprising:

a light source;

an optical deflector for scanning a light beam from the light source;

a first imaging optical system for forming a line image on a deflecting plane of the optical deflector, the first imaging optical system being positioned between the light source and the optical deflector; and a second imaging optical system formed of one correcting lens, the second imaging optical system being positioned between the optical deflector and a surface to be scanned, the first imaging optical system being positioned in a plane parallel to a main scanning direction including the normal line of the deflecting plane of the optical deflector and being formed so that a light beam from the first imaging optical system is incident obliquely onto the deflecting plane with respect to the main scanning direction, and at least one plane of the correcting lens being a curved-axis toric surface in which a line extending between centers of curvature of the cross section in a sub scanning direction is a curved line, wherein the optical deflector is positioned so that a reflecting point at a scanning center is shifted in a direction moving away from the center of the deflecting plane and from the light source and the following Formula 1 is satisfied:

$$0.15 < \frac{\Delta X \cdot \cos(\alpha/2)}{rp} < 0.35$$

wherein $\Delta X$ indicates a shift amount that is the distance between the reflecting point at the scanning center and the center of the deflecting plane, $\alpha$ represents an angle of reflection on the deflecting plane at the scanning center, and rp denotes the radius of an inscribed circle in the optical deflector.

2. The optical scanner according to claim 1, wherein in the correcting lens, a plane on an outgoing side is the curved-axis toric surface, the cross sectional shape in the main scanning direction including an optical axis is symmetrical with respect to the optical axis, and the curved line extending between the centers of curvature of the cross section in the sub scanning direction is asymmetric with respect to the optical axis.

3. The optical scanner according to claim 1, wherein a plane of incidence of the correcting lens is an aspheric cylindrical plane that has a cross sectional shape with high-order expansion terms of at least fourth order in the main scanning direction and that has a refractive power only in the main scanning direction.

4. An image reading apparatus, comprising an optical scanner according to claim 1.

5. An image forming apparatus, comprising an optical scanner according to claim 1.

6. An optical scanner, comprising:
a light source;
an optical deflector with at least six deflecting planes, the optical deflector scanning a light beam from the light source;
a first imaging optical system for forming a line image on a deflecting plane of the optical deflector, the first imaging optical system being positioned between the light source and the optical deflector; and
a second imaging optical system formed of one correcting lens, the second imaging optical system being positioned between the optical deflector and a surface to be scanned,
the first imaging optical system being positioned in a plane parallel to the main scanning direction including the normal line of the deflecting plane of the optical deflector and being formed so that a light beam from the first imaging optical system is incident obliquely onto the deflecting plane with respect to a main scanning direction, and on the outgoing side, the correcting lens having a curved-axis toric surface in which a line extending between centers of curvature of the cross section in a sub scanning direction is a curved line, wherein a plane of incidence of the correcting lens is an aspheric cylindrical plane having a cross sectional shape of high-order expansion terms of at least fourth order in the main scanning direction and having a refractive power only in the main scanning direction, and the optical deflector is positioned so that a reflecting point at a scanning center is shifted in a direction moving away from the center of the deflecting plane and from the light source within a range in which a light beam is not omitted in the vicinity of an edge of the deflecting plane.

7. The optical scanner according to claim 4, satisfying the following Formula 2:

$$0.15 < \frac{\Delta X \cdot \cos(\alpha/2)}{rp} < 0.35$$

wherein $\Delta X$ indicates a shift amount that is the distance between the reflecting point at the scanning center and the center of the deflecting plane, $\alpha$ represents an angle of reflection on the deflecting plane at the scanning center, and rp denotes a radius of an inscribed circle in the optical deflector.

8. The optical scanner according to claim 4, wherein on the outgoing side, the correcting lens has a curved-axis toric surface in which the cross sectional shape in the main scanning direction including an optical axis is asymmetric with respect to the optical axis and the curved line extending between the centers of curvature of the cross section in the sub scanning direction is asymmetric with respect to the optical axis.

* * * * *